(12) United States Patent
Miyamoto et al.

(10) Patent No.: US 8,534,046 B2
(45) Date of Patent: Sep. 17, 2013

(54) APPARATUS AND METHOD FOR DIAGNOSING CATALYST DETERIORATION

(75) Inventors: Hiroshi Miyamoto, Susono (JP); Toru Kidokoro, Hadano (JP); Hiroshi Sawada, Gotenba (JP); Yasushi Iwazaki, Ebina (JP); Koichi Kimura, Numazu (JP); Koichi Kitaura, Odawara (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 332 days.

(21) Appl. No.: 12/812,350

(22) PCT Filed: Feb. 27, 2009

(86) PCT No.: PCT/IB2009/000376
§ 371 (c)(1),
(2), (4) Date: Jul. 9, 2010

(87) PCT Pub. No.: WO2009/106973
PCT Pub. Date: Sep. 3, 2009

(65) Prior Publication Data
US 2010/0307135 A1    Dec. 9, 2010

(30) Foreign Application Priority Data
Feb. 28, 2008   (JP) ................................. 2008-048743

(51) Int. Cl.
*F01N 3/00*    (2006.01)
(52) U.S. Cl.
USPC .................. 60/277; 60/274; 60/276; 60/285; 60/299
(58) Field of Classification Search
USPC ..................... 60/274, 276, 277, 285, 299, 301
See application file for complete search history.

(56) References Cited

U.S. PATENT DOCUMENTS 5,357,754 A    10/1994 Ogawa et al.
5,655,363 A *  8/1997 Ito et al. ........................ 60/276

(Continued)

FOREIGN PATENT DOCUMENTS

EP    1 471 220 A2    10/2004
JP    A-6-159048       6/1994

(Continued)

OTHER PUBLICATIONS

Nov. 9, 2011 Japanese Office Action issued in Japanese Patent Application No. 2008-048743 (with partial translation).

(Continued)

*Primary Examiner* — Binh Q Tran
*Assistant Examiner* — Jorge Leon, Jr.
(74) *Attorney, Agent, or Firm* — Oliff & Berridge, PLC

(57) ABSTRACT

A catalyst deterioration diagnosing apparatus is provided with means for performing stoichiometric feedback control on the air-fuel ratio based on at least output from an upstream air-fuel ratio sensor provided upstream of a catalyst, means for measuring the oxygen storage capacity of the catalyst, and means for correcting the measured value of the oxygen storage capacity based on at least the output behavior of a downstream air-fuel ratio sensor provided downstream of the catalyst during the stoichiometric feedback control. The measured value of the oxygen storage capacity is corrected using the output behavior of the downstream air-fuel ratio sensor during stoichiometric feedback control. The diagnostic is performed after eliminating the effects from sulfur by correcting the measured value to a value corresponding to when low sulfur fuel is used, which makes it possible to prevent an erroneous diagnosis from being made.

8 Claims, 15 Drawing Sheets

(56) References Cited

U.S. PATENT DOCUMENTS

| | | |
|---|---|---|
| 5,743,086 A | 4/1998 | Nagai |
| 5,953,910 A | 9/1999 | Sato et al. |
| 2001/0013221 A1* | 8/2001 | Suzuki et al. .................... 60/285 |
| 2002/0139109 A1* | 10/2002 | Sakanushi et al. .............. 60/277 |
| 2003/0070421 A1 | 4/2003 | Sakai |
| 2007/0220863 A1 | 9/2007 | Iida et al. |
| 2008/0148711 A1* | 6/2008 | Takubo ........................... 60/285 |
| 2008/0226514 A1* | 9/2008 | Chen et al. .................... 422/168 |

FOREIGN PATENT DOCUMENTS

| | | |
|---|---|---|
| JP | A-08-144746 | 6/1996 |
| JP | A-10-54226 | 2/1998 |
| JP | A-11-030145 | 2/1999 |
| JP | A-2000-303825 | 10/2000 |
| JP | A-2003-148137 | 5/2003 |
| JP | A-2005-264808 | 9/2005 |
| JP | A-2006-257904 | 9/2006 |
| JP | A-2006-291773 | 10/2006 |

OTHER PUBLICATIONS

Written Opinion of the International Searching Authority dated Jul. 6, 2009 for corresponding International Application No. PCT/IB2009/000376.

International Search Report dated Jul. 6, 2009 for corresponding International Application No. PCT/IB2009/000376.

* cited by examiner

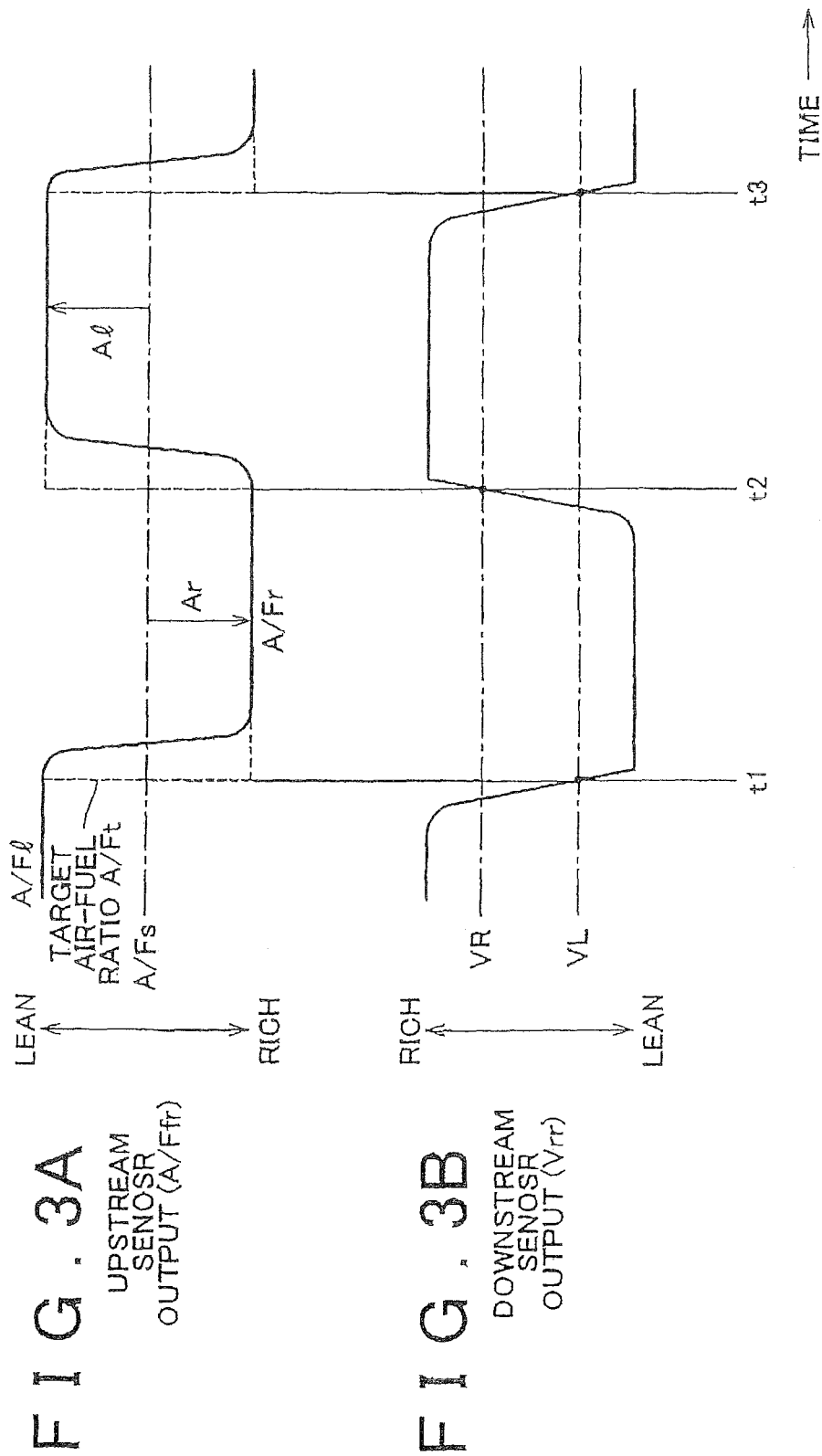

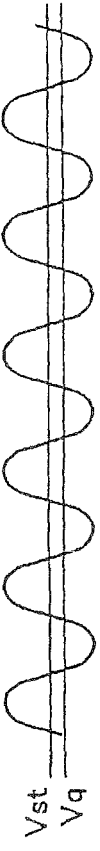
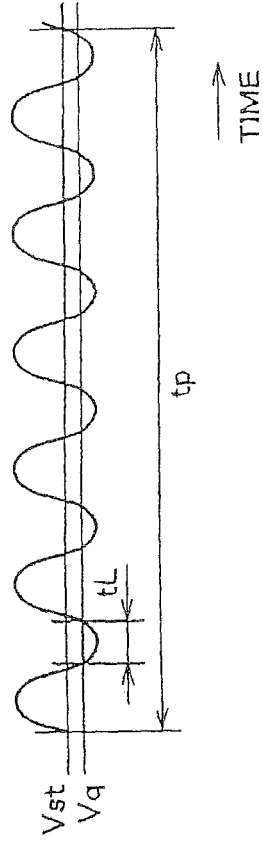
FIG. 6A
FIG. 6B
FIG. 6C
FIG. 6D

APPARATUS AND METHOD FOR DIAGNOSING CATALYST DETERIORATION

BACKGROUND OF THE INVENTION

1. Field of the Invention

The invention relates to an apparatus and method for diagnosing catalyst deterioration. More particularly, the invention relates to a catalyst deterioration diagnosing apparatus and method which takes into account the effect from sulfur in fuel used in an internal combustion engine.

2. Description of the Related Art

An internal combustion engine for a vehicle, for example, is provided with a catalyst for purifying exhaust gas arranged in its exhaust system. Some catalysts have the ability to store oxygen (i.e., an $O_2$ storage function) which adsorbs and retains excess oxygen in the exhaust gas when the air-fuel ratio of the exhaust gas flowing into the catalyst is greater than the stoichiometric air-fuel ratio, i.e., lean, and releases the adsorbed and retained oxygen when the air-fuel ratio of the exhaust gas flowing into the catalyst is less than the stoichiometric air-fuel ratio, i.e., rich. For example, in a gasoline engine, air-fuel ratio control is performed so that the air-fuel ratio of the exhaust gas flowing into the catalyst approaches the stoichiometric air-fuel ratio. However, when a three-way catalyst with the ability to store oxygen is used, even if the actual air-fuel ratio is off somewhat from the stoichiometric air-fuel ratio due to the driving conditions, the oxygen storing/releasing action of the three-way catalyst is able to absorb the air-fuel ratio difference.

Incidentally, when the catalyst deteriorates, the control (i.e., purification) efficiency of the catalyst decreases. Meanwhile, there is a correlation between the degree of deterioration of the catalyst and the degree to which the oxygen storage function has decreased, due to a reaction via a precious metal. Therefore, deterioration of the catalyst can be detected by detecting a decrease in the oxygen storage function. Typically, a method for diagnosing deterioration of a catalyst (i.e., a so-called Cmax method) is performed in which active air-fuel ratio control is performed which forcibly switches the air-fuel mixture in the combustion chamber, and thus the air-fuel ratio of the exhaust gas that flows into the catalyst, so that it is rich or lean, and then the oxygen storage capacity of the catalyst following execution of this active air-fuel ratio control is measured.

For example, Japanese Patent Application Publication No 6-159048 (JP-A-6-159048) describes an apparatus which i) switches the exhaust gas supplied to a catalyst from lean to rich with respect to the stoichiometric air-fuel ratio, ii) calculates the amount of oxygen released from the catalyst during a period of time from the switch until an output signal from an air-fuel ratio sensor downstream of the catalyst becomes rich, based on the total amount of exhaust gas that flowed through the catalyst during that period of time and the air-fuel ratio of exhaust gas supplied to the catalyst during that period of time, iii) recognizes this amount of oxygen as the ability of the catalyst to store oxygen, and iv) detects the degree of catalyst deterioration based on that ability to store oxygen.

Meanwhile, the fuel may contain a relatively high concentration of sulfur (S) depending on the (geographical) region where the internal combustion engine is being used and the like. When such fuel is used, the sulfur components accumulate in the catalyst, causing poisoning (S poisoning). When S poisoning occurs, the oxygen storage and release reaction of the catalyst becomes impeded, which reduces the apparent oxygen storage capacity of the catalyst. However, the catalyst recovers from the poisoning over time when fuel having a low sulfur concentration is used again. In this way, the decrease in performance of the catalyst due to S poisoning is temporary. Therefore, when diagnosing catalyst deterioration, it is important that this temporary decrease caused by S poisoning not be erroneously diagnosed as a malfunction or permanent deterioration such as heat deterioration that is normally supposed to be diagnosed. It is particularly important not to erroneously diagnose a catalyst that is operating normally but on the border between normal and deteriorated as being deteriorated.

SUMMARY OF THE INVENTION

This invention thus provides a catalyst deterioration diagnosing apparatus and a catalyst deterioration diagnostic method which can prevent an erroneous diagnosis from being made due to the effect from sulfur in fuel.

A first aspect of the invention relates to an apparatus for diagnosing deterioration of a catalyst provided in an exhaust passage of an internal combustion engine. This catalyst deterioration diagnosing apparatus includes an upstream air-fuel ratio sensor provided upstream of the catalyst; a downstream air-fuel ratio sensor provided downstream of the catalyst; air-fuel ratio controlling means for performing stoichiometric feedback control on the air-fuel ratio of exhaust gas that flows into the catalyst, based on output from the upstream air-fuel ratio sensor; measuring means for measuring the oxygen storage capacity of the catalyst; and correcting means for correcting the value of the oxygen storage capacity measured by the measuring means, based on the output behavior of the downstream air-fuel ratio sensor while the stoichiometric feedback control is being performed by the air-fuel ratio controlling means.

The output behavior of the downstream air-fuel ratio sensor while stoichiometric feedback control is being performed differs according to the sulfur concentration in the fuel. Therefore, the measured value of the oxygen storage capacity is corrected using this difference in output behavior. The diagnostic is performed after eliminating the effects from sulfur by correcting the measured value of the oxygen storage capacity to a value corresponding to when low sulfur fuel is used, which makes it possible to prevent an erroneous diagnosis from being made.

The correcting means may correct the measured value of the oxygen storage capacity based on a ratio per predetermined period of time of a period of time during which the output of the downstream air-fuel ratio sensor is leaner than a predetermined value.

When the fuel is changed from low sulfur fuel to high sulfur fuel, the entire output waveform of the downstream air-fuel ratio sensor shifts toward the rich side, and the ratio per predetermined unit time of the time during which the output of the downstream sensor is leaner than a predetermined value, i.e., the lean output time ratio, becomes lower. Accordingly, the lean output time ratio is a parameter that correlates to the sulfur concentration in the fuel and indicates the output behavior of the downstream air-fuel ratio sensor. Therefore, the correction can be made using the lean output time ratio.

The predetermined value may be set to a value corresponding to an air-fuel ratio that is leaner than the stoichiometric air-fuel ratio.

When the entire output waveform of the downstream air-fuel ratio sensor shifts toward the rich side, it becomes difficult to obtain a downstream air-fuel ratio sensor output that is leaner than the stoichiometric air-fuel ratio. Therefore, by setting the predetermined value to a value that corresponds to a lean air-fuel ratio, the difference in the lean output time ratio that corresponds to a change in the concentration of sulfur in the fuel can be made more apparent, thus enabling the accuracy of the correction to be improved.

The correcting means may correct the measured value of the oxygen storage capacity using a preset relationship between the ratio and the oxygen storage capacity.

It has been confirmed that there is a fixed correlation between the lean output time ratio and the oxygen storage capacity, and the decrease width of the lean output time ratio changes according to the original degree of catalyst deterioration, when there is a change from low sulfur fuel to high sulfur fuel. Therefore, this correlation is set beforehand with a map or functional expression, and is used to make the correction. Therefore, the correction is made also taking the degree to which the catalyst is deteriorated into account, regardless of the lean output time ratio, so an extremely accurate correction can be made, thus further improving the accuracy of the diagnosis.

The correcting means may correct the measured value of the oxygen storage capacity based on a trajectory length of the downstream air-fuel ratio sensor output while the stoichiometric feedback control is being performed.

When there is a change from low sulfur fuel to high sulfur fuel while stoichiometric feedback control is being performed, the entire output waveform of the downstream air-fuel ratio sensor shifts toward the rich side, such that the trajectory length of the downstream air-fuel ratio sensor tends to become shorter. Therefore, the trajectory length is also a parameter that correlates to the sulfur concentration in the fuel and is indicative of the output behavior of the downstream air-fuel ratio sensor. Accordingly, the correction can be made using the trajectory length.

The correcting means may correct the measured value of the oxygen storage capacity based on the ratio of a trajectory length of the downstream air-fuel ratio sensor output to the trajectory length of the upstream air-fuel ratio sensor output while the stoichiometric feedback control is being performed.

The trajectory length ratio also changes according to a change in the concentration of sulfur in the fuel, similar to the trajectory length of the downstream sensor output. The trajectory length ratio also takes into account fluctuation in the upstream air-fuel ratio as well as fluctuation in the downstream air-fuel ratio, so it is suitable as a parameter indicative of the output behavior of the downstream air-fuel ratio sensor. Accordingly, the correction can be made using, the trajectory length ratio.

The correcting means may correct the measured value of the oxygen storage capacity using a preset relationship between the trajectory length ratio and the oxygen storage capacity.

There is a fixed correlation between the trajectory length ratio and the oxygen storage capacity, similar to that between the lean output time ratio and the oxygen storage capacity. Therefore, an extremely accurate correction can be made using this correlation, which enables the diagnosis to be even more accurate.

The correcting means may correct the measured value of the oxygen storage capacity using the output behavior of the downstream air-fuel ratio sensor when the internal combustion engine is operating under a high load.

When the engine is operating under a high load, the fluctuation in the output of the downstream air-fuel ratio sensor is large so the difference in that output behavior, which corresponds to the sulfur concentration in the fuel being low, is even more evident.

Therefore, the accuracy of the correction, and thus the accuracy of the diagnosis, can be further improved.

The catalyst deterioration diagnosing apparatus described above may also include determining means for determining whether the catalyst is deteriorated by comparing the measured value of the oxygen storage capacity with a predetermined deterioration determining value. The correcting means may execute the correction when the measured value of the oxygen storage capacity is equal to or less than the deterioration determining value, and the determining means may determine whether the catalyst is deteriorated by comparing the corrected measured value of the oxygen storage capacity with the deterioration determining value.

The correction is only performed when the measured value of the oxygen storage capacity is equal to or less than the deterioration determining value. Accordingly, the correction is made as infrequently as possible, which simplifies the diagnostic routine.

A second aspect of the invention relates to a method for diagnosing deterioration of a catalyst provided in an exhaust passage of an internal combustion engine. This catalyst deterioration diagnostic method includes the steps of A) measuring the oxygen storage capacity of the catalyst; B) performing stoichiometric feedback control on the air-fuel ratio of exhaust gas that flows into the catalyst, based on output from an upstream air-fuel ratio sensor provided upstream of the catalyst; and C) correcting the value of the measured oxygen storage capacity based on the output behavior of a downstream air-fuel ratio sensor provided downstream of the catalyst while the stoichiometric feedback control is being performed.

In step C, the measured value of the oxygen storage capacity may be corrected based on a ratio per predetermined period of time of a period of time during which the output of the downstream air-fuel ratio sensor is leaner than a predetermined value.

The predetermined value may be set to a value corresponding to an air-fuel ratio that is leaner than the stoichiometric air-fuel ratio.

In step C, the measured value of the oxygen storage capacity may be corrected using a preset relationship between the ratio and the oxygen storage capacity.

In step C, the measured value of the oxygen storage capacity may be corrected based on a trajectory length of the downstream air-fuel ratio sensor output while the stoichiometric feedback control is being performed.

In step C, the measured value of the oxygen storage capacity may be corrected based on the ratio of a trajectory length of the downstream air-fuel ratio sensor output to the trajectory length of the upstream air-fuel ratio sensor output while the stoichiometric feedback control is being performed.

In step C, the measured value of the oxygen storage capacity may be corrected using a preset relationship between the trajectory length ratio and the oxygen storage capacity.

In step C, the measured value of the oxygen storage capacity may be corrected using the output behavior of the downstream air-fuel ratio sensor when the internal combustion engine is operating under a high load.

The correction in step C may be performed when the value of the oxygen storage capacity measured in step A is equal to or less than a predetermined deterioration determining value. The catalyst deterioration diagnostic method may also include the step of D) determining whether the catalyst is deteriorated by comparing the corrected measured value of the oxygen storage capacity, with the predetermined deterioration determining value.

Accordingly, the invention displays the excellent effect of being able to prevent an erroneous diagnosis from being made due to the effect from sulfur in the fuel.

BRIEF DESCRIPTION OF THE DRAWINGS

The foregoing and further features and advantages of the invention will become apparent from the following description of example embodiments with reference to the accompanying drawings, wherein like numerals are used to represent like elements, and wherein:

FIGS. 3A and 3B are time charts illustrating active air-fuel ratio control;

FIGS. 6A to 6D are time charts illustrating the output behavior of the upstream air-fuel ratio sensor and the downstream air-fuel ratio sensor during stoichiometric feedback control;

DETAILED DESCRIPTION OF THE EMBODIMENTS

Example embodiments of the present invention will be described in greater detail below with reference to the accompanying drawings.

Figure 1:
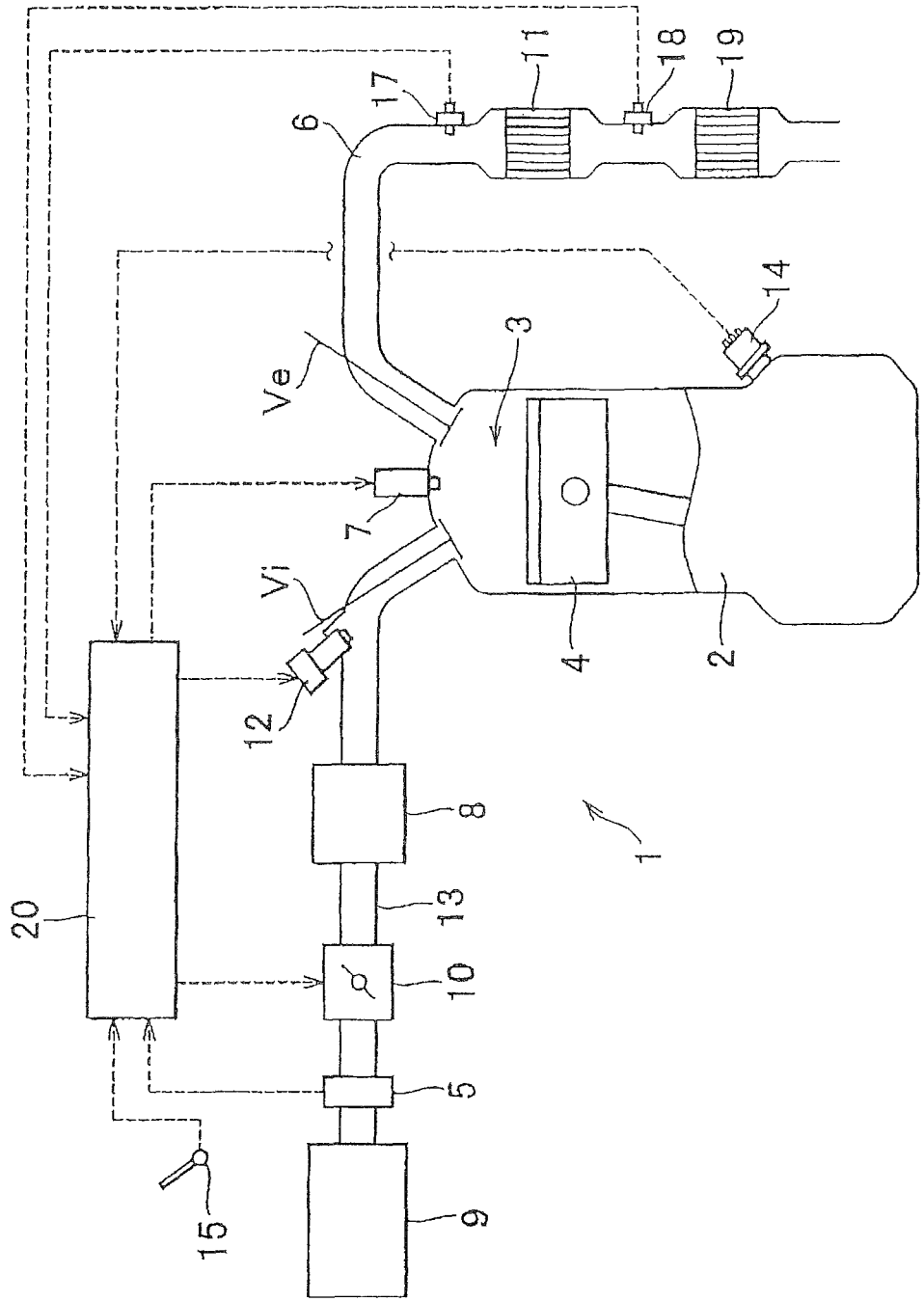
FIG. 1 is a schematic diagram of the structure of a first example embodiment of the invention.

FIG. 1 is a schematic diagram of the structure of a first example embodiment of the invention. As shown in the drawing, an internal combustion engine 1 generates power, by combusting a mixture of air and fuel in a combustion chamber 3 formed in a cylinder block 2. This combustion generates force that moves a piston 4 back and forth within the cylinder block 2. The internal combustion engine is a multiple cylinder engine for a vehicle (only one cylinder is shown in the drawing), and is a spark ignition internal combustion engine such as a gasoline engine.

An intake valve Vi that opens and closes an intake port, and an exhaust valve Ve that opens and closes an exhaust port are provided for each cylinder, in a cylinder head of the internal combustion engine 1. The intake valves Vi and exhaust valves Ve are opened and closed by a cam shaft, not shown. Also, a spark plug 7 for igniting the air-fuel mixture is installed for each cylinder at the top of the cylinder head.

The intake port of each cylinder is connected via a branch pipe for each cylinder to a surge tank 8 which is an intake air collecting chamber. An intake pipe 13 that forms an intake air collecting passage is connected to the upstream side of the surge tank 8. An air cleaner 9 is provided at the upstream end of the intake air pipe 13. An airflow meter 5 for detecting the intake air amount and an electronically controlled throttle valve 10 are incorporated, in that order from the upstream side, into the intake pipe 13. Incidentally, the intake port, the surge tank 8, and the intake pipe 13 together form an intake passage.

A fuel injector (i.e., a fuel injection valve) 12 that injects fuel into the intake passage, or more particularly, into the intake port, is provided for each cylinder. Fuel injected from the fuel injector 12 mixes with the intake air to form an air-fuel mixture which is drawn into the combustion chamber 3 when the intake valve Vi opens. In the combustion chamber 3, this air-fuel mixture is then compressed by the piston 4 and then ignited by the spark plug 7 so that it combusts.

Figure 5:
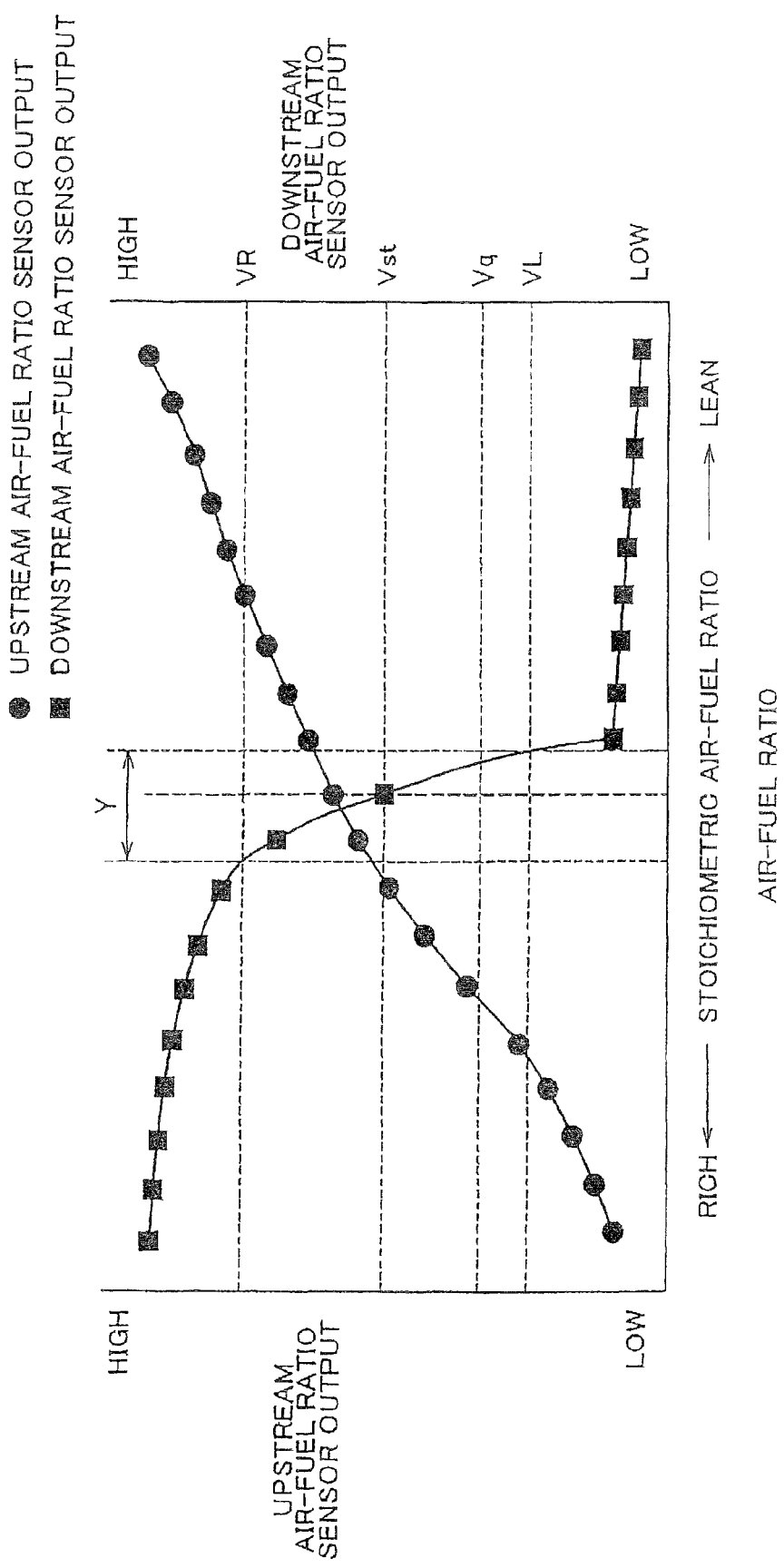
FIG. 5 is a graph showing the output characteristics of an upstream air-fuel ratio sensor provided upstream of the catalyst and a downstream air-fuel ratio sensor provided downstream of the catalyst.

Meanwhile, the exhaust port of each cylinder is connected via a branch pipe for each cylinder to an exhaust pipe 6 that forms an exhaust gas collecting passage. Two catalysts 11 and 19 which are three way catalysts that are able to store oxygen are provided in series in the exhaust pipe 6. Incidentally, the exhaust port, the branch pipe, and the exhaust pipe 6 together form an exhaust passage. An air-fuel ratio sensor 17 for detecting the air-fuel ratio of the exhaust gas is arranged upstream of the upstream catalyst 11 (hereinafter this air-fuel ratio sensor will be referred to as "upstream air-fuel ratio sensor 17"). Similarly, an air-fuel ratio sensor 18 for detecting the air-fuel ratio of the exhaust gas is arranged downstream of the upstream catalyst 11 (hereinafter this air-fuel ratio sensor will be referred to as "downstream air-fuel ratio sensor 18"). The upstream air-fuel ratio sensor 17 is a so-called wide-range air-fuel ratio sensor which is able to continuously detect the air-fuel ratio over a relatively wide range and outputs a signal indicative of a value proportional to that air-fuel ratio. On the other hand, the downstream air-fuel ratio sensor 18 is a so-called $O_2$ sensor that has a characteristic in which the output value suddenly changes when the air-fuel ratio crosses the stoichiometric air-fuel ratio. FIG. 5 shows the output characteristics of the upstream air-fuel ratio sensor 17 and the downstream air-fuel ratio sensor 18. Incidentally, the downstream air-fuel ratio sensor 18 is arranged between the upstream catalyst 11 and the downstream catalyst 19.

The spark plug 7, the throttle valve 10, and the fuel injector 12 and the like are electrically connected to an electronic control unit (hereinafter simply referred to as "ECU") 20 that serves as controlling means. The ECU 20 includes a CPU, ROM, RAM, input/output ports, and a storage device and the like, none of which are shown. Also, as shown in the drawing, the airflow meter 5, the upstream air-fuel ratio sensor 17, and the downstream air-fuel ratio sensor 18, as well as a crank angle sensor 14 for detecting the crank angle of the internal combustion engine 1, an accelerator operation amount sensor 15 for detecting the accelerator operation amount, and various other sensors are electrically connected to the ECU 20 via an A/D converter and the like, not shown. The ECU 20 controls the ignition timing, the fuel injection quantity, the fuel injection timing, and the throttle opening amount and the like by controlling the spark plug 7, the throttle valve 10, the fuel injector 12 and the like to obtain the desired output, based on the detection values from the various sensors and the like.

The catalysts 11 and 19 simultaneously purify $NO_X$, HC, and CO when the air-fuel ratio A/F of the exhaust gas that flows into the catalysts 11 and 19 is near the stoichiometric air-fuel ratio A/Fs (which is for example is 14.6). For this, the ECU 20 performs feedback control (i.e., stoichiometric feedback control) on the air-fuel ratio of the exhaust gas flowing into the upstream catalyst 11, i.e., the upstream air-fuel ratio A/Ffr, so that it comes to match the stoichiometric air-fuel ratio. More specifically, the ECU 20 sets a target air-fuel ratio A/Ft that is equivalent to the stoichiometric air-fuel ratio, and feedback controls the fuel injection quantity injected from the fuel injector 12, and therefore the air-fuel ratio, so that the upstream air-fuel ratio A/Ffr detected by the upstream air-fuel ratio sensor 17 comes to match the target air-fuel ratio A/Ft. This control will be referred to as main feedback control.

Also, the ECU 20 normally controls the air-fuel ratio so that the air-fuel ratio of the exhaust gas that flows out of the catalyst 11, i.e., the downstream air-fuel ratio A/Frr detected by the downstream air-fuel ratio sensor 18, also comes to match the stoichiometric air-fuel ratio. This control will be referred to as sub-feedback control. Even if the main feedback control is executed, there may be times when the actual center air-fuel ratio is off (i.e., differs) from the stoichiometric air-fuel ratio due to product variation or deterioration or the like of the upstream air-fuel ratio sensor 17. Therefore, sub-feedback control is performed simultaneously in order to correct this difference. The main feedback control is executed at extremely short time cycles on the order of milliseconds, while the sub-feedback control is executed at relatively long time cycles on the order of seconds. The correction amount of the sub-feedback control is updated at every long time cycle.

In this way, in this example embodiment, the stoichiometric feedback control includes the main feedback control that is based on output from the upstream air-fuel ratio sensor 17, and the sub-feedback control that is based on output from the downstream air-fuel ratio sensor 18. However, the sub-feedback control is supplementary so it may be omitted as long as the main feedback control is performed.

Figure 2:
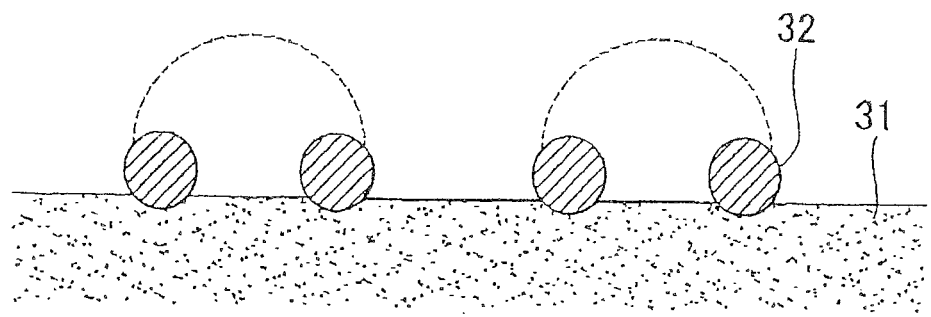
FIG. 2 is a sectional view schematically showing the structure of a catalyst.

Here, the upstream catalyst 11 will be described in more detail. Incidentally, the following description also applies in the same way to the downstream catalyst 19. As shown in FIG. 2, in the catalyst 11, the surface of a carrier substrate, not shown, is coated with coating material 31. A particulate catalytic component 32 is carried, spread out over and retained by this coating material 31, while being exposed inside the catalyst 11. This catalytic component 32 is formed mainly of a precious metal such as Pt or Pd, and acts as the active site when reacting with exhaust gas components such as $NO_X$, HC, and CO. Meanwhile, the coating material 31 serves as a promoter that promotes a reaction at the interface of the exhaust gas and the catalytic component 32, and includes an oxygen storage component capable of storing and releasing oxygen according to the air-fuel ratio of the atmosphere gas. The oxygen storage component is formed of cerium dioxide $CeO_2$ or zirconia, for example. For example, when the atmosphere gas of the coating material 31 and the catalytic component 32 is richer than the stoichiometric air-fuel ratio, oxygen stored in the oxygen storage component around the catalytic component 32 is released. As a result, unburned components such as HC and CO are oxidized and purified by the released oxygen. Conversely, when the atmosphere gas of the coating material 31 and the catalytic component 32 is leaner than the stoichiometric air-fuel ratio, the oxygen storage component around the catalytic component 32 adsorbs oxygen from the atmosphere gas. As a result, $NO_X$ is reduced and purified.

This kind of oxygen storing and releasing action enables three exhaust gas components, i.e., $NO_X$, HC, and CO, to be simultaneously purified even if the upstream air-fuel ratio A/Ffr differs somewhat from the stoichiometric air-fuel ratio when normal air-fuel ratio control is performed. Therefore, during normal air-fuel ratio control, it is possible to purify the exhaust gas by actually making the upstream air-fuel ratio A/Ffr fluctuate ever so slightly around the stoichiometric air-fuel ratio and thus repeatedly store and release oxygen.

Incidentally, in the catalyst 11 when it is new, the catalytic component 32 which is in the form of fine particles as described above is spread out evenly so the probability of contact between the exhaust gas and the catalytic component 32 is kept high. However, as the catalyst 11 deteriorates, some of the catalytic component 32 is lost. Moreover, adjacent particles of the catalytic component 32 may become baked together by the heat of the exhaust gas (refer to the broken line in the drawing). This reduces probability of contact with the exhaust gas so the conversion efficiency of the catalytic component 32 starts to decrease. In addition, the amount of coating material 31 around the catalytic component 32, i.e., the amount of oxygen storage component, decreases so the ability to store oxygen decreases.

In this way, there is a correlation between the degree to which the catalyst 11 is deteriorated and the degree to which the ability of the catalyst 11 to store oxygen decreases. Therefore, in this example embodiment, the degree to which the upstream catalyst 11, which has a large effect on emissions in particular, is deteriorated is detected by detecting the ability of the upstream catalyst 11 to store oxygen. Here, the ability of the catalyst 11 to store oxygen is indicated by the oxygen storage capacity (OSC: $O_2$ storage capacity. Unit: grams), which is the maximum amount of oxygen that can currently be stored by the catalyst 11.

The catalyst deterioration diagnostic in this example embodiment is fundamentally performed using the Cmax method described above. When diagnosing deterioration of the catalyst 11, the ECU 20 executes active air-fuel ratio control. During active air-fuel ratio control, the air-fuel ratio of the air-fuel mixture, and therefore the upstream air-fuel ratio A/Ffr, is actively (forcibly) switched alternately between rich and lean across a predetermined center air-fuel ratio A/Fc. Incidentally, the air-fuel ratio when switched to the rich side will be referred to as the "rich air-fuel ratio A/Fr", and the air-fuel ratio when switched to the lean side will be referred to as the "lean air-fuel ratio A/Fl". The oxygen storage capacity OSC of the catalyst is measured while the upstream air-fuel ratio A/Ffr is in the middle of being switched to the rich side or the lean side by this active air-fuel ratio control.

The deterioration diagnosis of the catalyst 11 is performed when the internal combustion engine 1 is operating steadily and the catalyst 11 is in the active temperature range. The temperature (i.e., the catalyst bed temperature) of the catalyst 11 may be directly detected using a temperature sensor, but in this example embodiment it is estimated from the operating state of the internal combustion engine. For example, the ECU 20 estimates the temperature Tc of the catalyst 11 using a preset map, based on the intake air amount Ga that is detected by the airflow meter 5. Incidentally, a parameter other than the intake air amount Ga, such as the engine speed Ne (rpm), may also be included as a parameter for estimating the catalyst temperature.

The output of the upstream air-fuel ratio sensor 17 and the output of the downstream air-fuel ratio sensor 18 while active air-fuel ratio control is being executed are shown by the solid lines in FIGS. 3A and 3B. Also, the target air-fuel ratio A/Ft generated in the ECU 20 is shown by the broken line in FIG. 3A. Incidentally, FIG. 3A shows the conversion value to the upstream air-fuel ratio A/Ffr, and FIG. 3B shows the output voltage Vrr of the downstream air-fuel ratio sensor 18.

As shown in FIG. 3A, the target air-fuel ratio A/Ft is forcibly and alternately switched around the air-fuel ratio A/Fs as the center air-fuel ratio between i) an air-fuel ratio (i.e., rich air-fuel ratio A/Fr) that is separated by a predetermined amplitude (i.e., rich amplitude Ar, where Ar>0) from that air-fuel ratio toward the rich side, and an air-fuel ratio (i.e., lean air-fuel ratio A/Fl) that is separated by a predetermined amplitude (i.e., lean amplitude Al, where Al>0) from that air-fuel ratio toward the lean side. Then following the switch of the target air-fuel ratio A/Ft, the upstream air-fuel ratio A/Ffr as the actual value is also switched after a slight time delay with respect to the target air-fuel ratio A/Ft. From this, it can be understood that the target air-fuel ratio A/Ft and the upstream air-fuel ratio A/Ffr are equivalent except for that there is a time delay. Incidentally, only the main feedback control in which the target air-fuel ratio A/Ft is made the rich air-fuel ratio A/Fr or the lean air-fuel ratio A/Fl is performed during active air-fuel ratio control. The sub-feedback control is not performed at this time.

In the example in the drawings, the rich amplitude Ar and the lean amplitude Al are equal. For example, the center air-fuel ratio=stoichiometric air-fuel ratio A/Fs=14.6, the rich air-fuel ratio A/Fr=14.1, the lean air-fuel ratio A/Fl=15.1, and the rich amplitude Ar=the lean amplitude Al=0.5. The amplitude of the air-fuel ratio is larger, i.e., the values of the rich amplitude Ar and the lean amplitude Al are larger, with the active air-fuel ratio control than with normal stoichiometric feedback control.

Incidentally, the timing that the target air-fuel ratio A/Ft is switched is the timing at which the output from the downstream air-fuel ratio sensor 18 switches (or reverses) from rich to lean or from lean to rich. Here, as shown in the drawings, the output voltage Vrr of the downstream air-fuel ratio sensor 18 suddenly changes at the stoichiometric air-fuel ratio A/Fs. In order to determine the reversal timing of the output voltage Vrr, i.e., whether the output voltage Vrr has reversed to the rich side or reversed to the lean side, two reversal threshold values VR and VL relating to the output voltage Vrr are set. Here, VR is the rich determining value and VL is the lean determining value. VR is greater than VL. For example, VR is 0.59 (V) and VL is 0.21 (V). When the output voltage Vrr changes to the lean side, i.e., decreases, and reaches the lean determining value VL, the output voltage Vrr is determined to have reversed to the lean side, and it is determined that the downstream air-fuel ratio A/Frr detected by the downstream air-fuel ratio sensor 18 is at least leaner than the stoichiometric air-fuel ratio. On the other hand, when the output voltage Vrr changes to the rich side, i.e., increases, and reaches the rich determining value VR, the output voltage Vrr is determined to have reversed to the rich side, and it is determined that the downstream air-fuel ratio A/Frr detected by the downstream air-fuel ratio sensor 18 is at least richer than the stoichiometric air-fuel ratio. As shown in FIG. 5, the stoichiometric air-fuel ratio is included in the narrow region Y (referred to as the transition region) between an air-fuel ratio corresponding to the lean determining value VL and an air-fuel ratio corresponding to the rich determining value VR. Basically, it is only possible to detect from the output voltage Vrr whether the downstream air-fuel ratio A/Frr is richer or leaner than the stoichiometric air-fuel ratio. It is difficult to detect the absolute value of the downstream air-fuel ratio A/Frr from the output voltage Vrr.

As shown in FIGS. 3A and 3B, when the output voltage of the downstream air-fuel ratio sensor 18 has changed from a value on the rich side, to a value on the lean side and become equal to the lean determining value VL (at time t1), the target air-fuel ratio A/Ft is switched from the lean air-fuel ratio A/Fl to the rich air-fuel ratio A/Fr. Then when the output voltage of the downstream air-fuel ratio sensor 18 has changed from a value on the lean side to a value on the rich side and become equal to the rich determining value VR (at time t2), the target air-fuel ratio A/Ft is switched from the rich air-fuel ratio A/Fr to the lean air-fuel ratio A/Fl. In this way, the air-fuel ratio is controlled to actively switch to the rich side or the lean side every time the downstream air-fuel ratio A/Frr detected by the downstream air-fuel ratio sensor 18 reverses to the lean side or the rich side.

While executing active air-fuel ratio control that changes the air-fuel ratio in this way, the oxygen storage capacity OSC of the catalyst 11 is measured and deterioration of the catalyst 11 is determined in the manner described below.

Referring to FIG. 3, before time t1 the target air-fuel ratio A/Ft is set to the lean air-fuel ratio A/Fl such that lean gas is flowing into the catalyst 11. At this time, oxygen continues to be stored in the catalyst 11 until the catalyst 11 becomes saturated (full) with oxygen and can store no more. When the catalyst 11 is in this state, the lean gas passes through it and flows on out to the downstream side. When this happens, the downstream air-fuel ratio A/Frr becomes lean, and when the output voltage of the downstream air-fuel ratio sensor 18 reaches the lean determination value VL (at time t1), the target air-fuel ratio A/Ft is switched to the rich air-fuel ratio A/Fr, or reversed.

Now rich gas starts to flow into the catalyst 11. At this time, oxygen that had been stored in the catalyst 11 continues to be released, so exhaust gas at substantially the stoichiometric air-fuel ratio A/Fs flows out downstream of the catalyst 11. Therefore since the downstream air-fuel ratio A/Frr will not become rich, the output of the downstream air-fuel ratio sensor 18 does not reverse. Oxygen continues to be released from the catalyst 11 until eventually all of the stored oxygen has been released, at which point the catalyst 11 can release no more. When the catalyst 11 is in this state, rich gas passes through it and flows on out to the downstream side. When this happens, the downstream air-fuel ratio A/Frr becomes rich, and when the output voltage of the downstream air-fuel ratio sensor 18 reaches the rich determination value VR (at time t2), the target air-fuel ratio A/Ft is switched to the lean air-fuel ratio A/Fl.

A larger oxygen storage capacity means that oxygen can continue to be stored or released for a longer period of time. That is, when the catalyst has not deteriorated, the reversing cycle (e.g., the period of time between time t1 and time t2) of the target air-fuel ratio A/Ft is long. As the catalyst deteriorates, the reversing cycle of the target air-fuel ratio A/Ft becomes shorter.

Figures 4A, 4B:
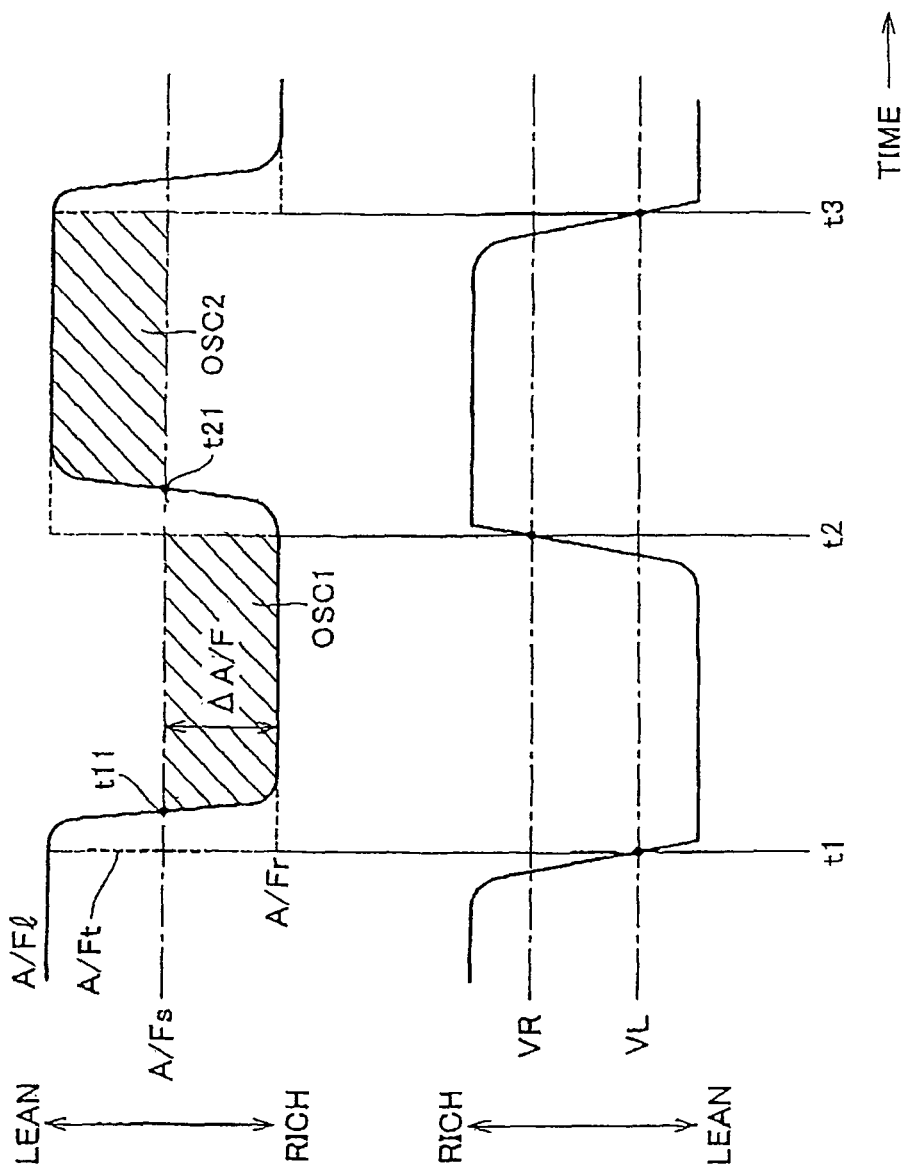
FIGS. 4A and 4B are time charts similar to FIGS. 3A and 3B, but which illustrate a method for measuring oxygen storage capacity.

Therefore, the oxygen storage capacity OSC is measured in the manner described below using this knowledge. As shown in FIG. 4, immediately after the target air-fuel ratio A/Ft has switched to the rich air-fuel ratio A/Fr at time t1, the upstream air-fuel ratio A/Ffr which is the actual value switches to the rich air-fuel ratio A/Fr after a slight delay. Then the oxygen storage capacity dOSC (i.e., an instantaneous value of the oxygen storage capacity) at extremely small predetermined intervals of time is calculated according to Expression (1) below from time t11 when the upstream air-fuel ratio A/Ffr has reached the stoichiometric air-fuel ratio A/Fs until time t2 when the target air-fuel ratio A/Ft reverses next, and these oxygen storage capacities dOSC at extremely small predetermined intervals of time are added up from time t11 until time t2. In this way, the oxygen storage capacity, i.e., the amount of oxygen released (OSC1 in FIG. 4) for this oxygen release cycle is measured.

$$dOSC = \Delta A/F \times Q \times K = |A/Ffr - A/Fs| \times Q \times K \quad (1)$$

Here, Q is the fuel injection quantity. The amount of excess or insufficient air to achieve the stoichiometric air-fuel ratio can be calculated by multiplying the fuel injection quantity Q by the air-fuel ratio difference ΔA/F. K is a constant that represents the percentage of oxygen (approximately 0.23) in the air.

Basically, the determination as to whether the catalyst is deteriorated can be made by comparing one such measurement of the oxygen storage capacity OSC with a predetermined deterioration determining value OSCs, If the oxygen storage capacity OSC exceeds the deterioration determining value OSCs, it means that the catalyst is normal. If, on the other hand, the oxygen storage capacity OSC is equal to or less than the deterioration determining value OSCs, it means that the catalyst is deteriorated. However, in this example embodiment, in order to improve accuracy, the oxygen storage capacity (the amount of stored oxygen in this case) is also measured for the oxygen storage cycle in which the target air-fuel ratio A/Ft is lean, and the average value of these oxygen storage capacities is measured as one oxygen storage capacity unit related to one storage and release cycle. The values for a plurality of oxygen storage capacity units are obtained, and the average value of these is taken as the final measured value of the oxygen storage capacity.

Regarding the measurement of the oxygen storage capacity (i.e., the amount of stored oxygen) in the oxygen storage cycle, as shown in FIG. 4, after the target air-fuel ratio A/Ft has switched to the lean air-fuel ratio A/Fl at time t2, the oxygen storage capacity dOSC at extremely small intervals of time are calculated according to Expression (1) above from time t21 when the upstream air-fuel ratio A/Ffr reaches the stoichiometric air-fuel ratio A/Fs until time t3 when the target air-fuel ratio A/Ft next reverses to the rich side, and the oxygen storage capacities dOSC at the extremely small intervals of time are added up. In this way, the oxygen storage capacity OSC for this oxygen storage cycle, i.e., the amount of oxygen stored (OSC2 in FIG. 4), is measured. Ideally, the oxygen storage capacity OSC1 during the oxygen release cycle and the oxygen storage capacity OSC2 during the oxygen storage cycle are substantially equal values.

Next, a determination as to whether the catalyst is deteriorated (i.e., the deterioration determination) is made using this measured value of the oxygen storage capacity (hereinafter also referred to as the "oxygen storage capacity measured value"). That is, the oxygen storage capacity measured value OSC is compared with the predetermined deterioration determining value OSCs. If the oxygen storage capacity measured value OSC is larger than the deterioration determining value OSCs, it is determined that the catalyst is normal. If, on the other hand, the oxygen storage capacity measured value OSC is equal to or less than the deterioration determining value OSCs, it is determined that the catalyst is deteriorated. Incidentally, if it is determined that the catalyst is deteriorated, a warning device such as a check lamp may be activated to alert the user.

Incidentally, as described above, when fuel having a high concentration of sulfur (i.e., high sulfur fuel) is used, the catalyst sustains sulfur poisoning, and as a result, the measured value of the oxygen storage capacity decreases. This may result in an erroneous diagnosis that the catalyst is deteriorated when in fact it is normal. Therefore, in this example embodiment, the oxygen storage capacity measured value is corrected to a value that might be obtained when it is estimated that fuel having a low concentration of sulfur (i.e., low sulfur fuel) is used, and then the deterioration determination is made. Making the deterioration determination after eliminating the effect from sulfur by increase-correcting the value of the oxygen storage capacity that was reduced from the effect of the sulfur to a value corresponding to low sulfur fuel makes it possible to reliably prevent an erroneous determination, and thus an erroneous diagnosis, from being made due to the effect from the sulfur.

This correction is made based on the output behavior of the downstream air-fuel ratio sensor 18 during stoichiometric feedback control. That is, the output behavior is different when low sulfur fuel is being used than it is when high sulfur fuel is being used, so the oxygen storage capacity measured value can be corrected using this difference in output behavior.

FIGS. 6A to 6D show the output behavior of the upstream and downstream air-fuel ratio sensors 17 and 18 during stoichiometric feedback control. FIG. 6A shows the output of the upstream air-fuel ratio sensor 17, particularly the value converted to the upstream air-fuel ratio A/Ffr. FIGS. 6B, 6C, and 6D show the output of the downstream air-fuel ratio sensor 18, particularly the output voltage Vrr itself. FIG. 6B shows a case in which the catalyst is normal and low sulfur fuel is used. FIG. 6C shows a case in which the catalyst is deteriorated and low sulfur fuel is used and FIG. 6D shows a ease in which the catalyst is deteriorated and high sulfur fuel is used.

During stoichiometric feedback control, as shown in FIG. 6A, the output of the upstream air-fuel ratio sensor 17 is maintained near the stoichiometric air-fuel ratio and fluctuates with a small amplitude around the stoichiometric air-fuel ratio. As shown in FIG. 6B, when the catalyst is normal and low sulfur fuel is used, the output behavior of the downstream air-fuel ratio sensor 18 is the same as that of the upstream air-fuel ratio sensor 17, with the output Vrr of the downstream air-fuel ratio sensor 18 tending to slightly fluctuate around a stoichiometric corresponding value Vst. The oxygen storing and releasing action of the catalyst 11 is able to sufficiently absorb the change in the air-fuel ratio of the exhaust gas flowing, into the catalyst 11, so gas of substantially the stoichiometric air-fuel ratio flows out downstream of the catalyst 11.

However, as shown in FIG. 6C, when the catalyst is deteriorated and low, sulfur fuel is used, the fluctuation in the output of the downstream air-fuel ratio sensor 18 is large. This is due to the fact that as the catalyst deteriorates the ability of the catalyst 11 to store and release oxygen decreases such that the catalyst 11 is unable to sufficiently purify lean gas or rich gas flowing into the catalyst 11. As a result, that lean gas or rich gas flows out downstream of the catalyst 11. When the downstream air-fuel ratio sensor 18 detects this, its output fluctuates.

Also, as shown in FIG. 6D, when the catalyst is deteriorated and high sulfur fuel is used, the output waveform of the downstream air-fuel ratio sensor 18 as shown in FIG. 6C becomes an output waveform that has entirely shifted toward the rich side. The reason for this is thought to be as follows.

First, when oxygen is stored in the catalyst when the upstream air-fuel ratio A/Ffr is lean, only the oxygen in the lean gas is adsorbed onto the oxygen storage component of the catalyst. However, when high sulfur fuel is used, the sulfur component is also adsorbed onto the oxygen storage component of the catalyst, which reduces the oxygen adsorption ability by that amount. Despite this, the reaction rate, i.e., the oxygen adsorption rate, in the catalyst from the effect of the sulfur does not decrease that much.

Incidentally, when oxygen is released from the catalyst when the upstream air-fuel ratio A/Ffr is rich, the oxygen that had been adsorbed on the oxygen storage component of the catalyst is stripped off by the rich gas via the catalytic component 32 formed of precious metal, and reacts with the rich gas. However, when high sulfur fuel is used, the catalytic component 32 and the oxygen storage component become poisoned by the sulfur compound, causing the reaction rate and the oxygen release rate via the catalytic component 32 to decrease remarkably so that rich gas not consumed in the reaction ends up flowing through the catalyst early on. In this way, when there is a change from low sulfur fuel to high sulfur fuel, there is a significant difference between the change in the oxygen adsorption rate and the oxygen release rate.

That is, when high sulfur fuel is used, rich gas, a large amount of rich gas, more than lean gas, flows right through to the downstream side of the catalyst. This may cause the downstream air-fuel ratio sensor output waveform when high sulfur fuel is used as shown in FIG. 6D to shift to the rich side more than when low sulfur fuel is used as shown in FIG. 6C. Incidentally, although not shown, even when the catalyst is normal, a similar change in the downstream air-fuel ratio sensor output waveform is recognized when there is a change from low sulfur fuel to high sulfur fuel.

Accordingly, the oxygen storage capacity measured value can be corrected to eliminate the effect from sulfur using the difference in the downstream air-fuel ratio sensor output behavior. For example, a rich/lean time ratio is set as a parameter that correlates to the sulfur concentration of the fuel. This rich/lean time ratio is a ratio of the time during which the downstream air-fuel ratio sensor output Vrr is greater than the stoichiometric corresponding value Vst to the time during which the downstream air-fuel ratio sensor output Vrr is less than the stoichiometric corresponding value Vst, per a predetermined period of time. When the rich/lean time ratio has increased to equal to or greater than a predetermined value, it is presumed that fuel having a high concentration of sulfur was used, and the measured value of the oxygen storage capacity that was measured after that increase is corrected to the measured value of the oxygen storage capacity that was measured before that increase. As a result, an accurate deterioration diagnosis can be made that is not affected by the sulfur.

In this example embodiment, a ratio per predetermined period of time tp of the time during which the downstream air-fuel ratio sensor output Vrr is less than a predetermined value Vq (i.e., is lean), i.e., a lean output time ratio HL, as shown in FIGS. 6A to 6D, is used as a parameter that correlates to the sulfur concentration of the fuel. More specifically, the time during which the downstream air-fuel ratio sensor output Vrr is less than the predetermined value Vq, i.e., the lean time tL, as shown in FIGS. 6A to 6D, is added up during the predetermined period of time tp, and the quotient obtained by dividing that cumulative lean time $\Sigma tL$ by the predetermined period of time tp is the lean output time ratio HL (i.e., HL=$\Sigma tL$/tp). The predetermined value Vq is set to a value corresponding to a leaner fuel air-fuel ratio than the stoichiometric air-fuel ratio. More specifically, the predetermined value Vq is set to a value that is lower than the stoichiometric corresponding value Vst and higher than the output value when the air-fuel ratio is sufficiently lean (i.e., a lean limit value such as around 0.1 (V), for example), as shown in FIG. 5. In this example embodiment, the predetermined value Vq is set to a slightly higher value than the lean determining value VL, such as 0.3 (V), for example. As the concentration of the sulfur in the fuel increases, the downstream air-fuel ratio sensor output waveform shifts toward the rich side, i.e., the high output side, so the lean output time ratio HL tends to decrease.

When the entire output waveform of the downstream air-fuel ratio sensor 18 shifts toward the rich side, it becomes difficult to obtain a downstream air-fuel ratio sensor output Vrr that is leaner than the stoichiometric air-fuel ratio. Therefore, by setting the predetermined value Vq to a value that corresponds to a lean air-fuel ratio, the difference in the lean output time ratio HL that corresponds to a change in the concentration of sulfur in the fuel can be made more apparent, thus enabling the accuracy of the correction to be improved.

Figure 7:
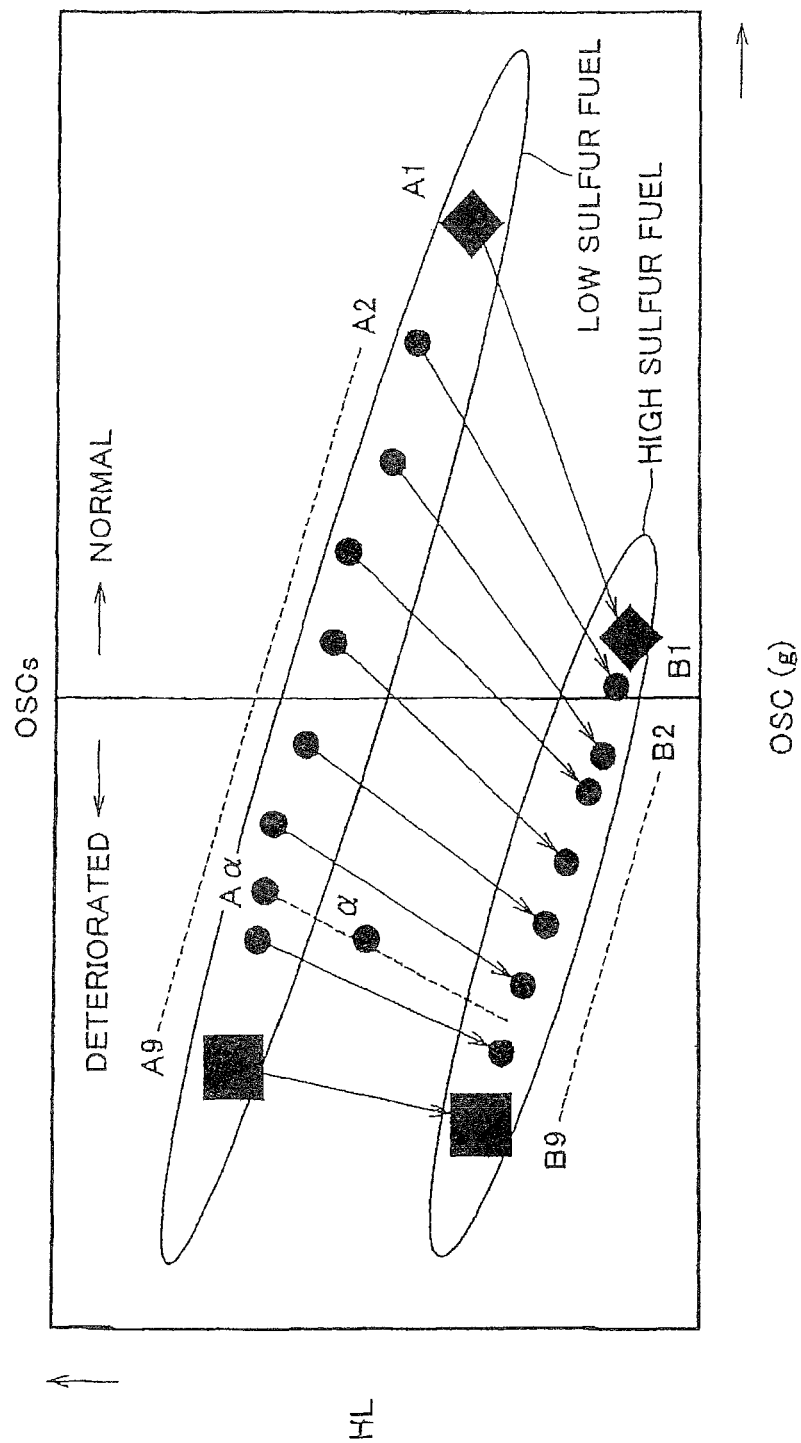
FIG. 7 is a graph showing the relationship between the oxygen storage capacity of the catalyst and the lean output time ratio.

Incidentally, the results of tests performed by the inventors confirmed that i) there is a fixed correlation between the lean output time ratio HL and the oxygen storage capacity OSC, and ii) the decrease width of the lean output time ratio changes according to the original degree of catalyst deterioration, when there is a change from low sulfur fuel to high sulfur fuel. FIG. 7 shows this.

More specifically, FIG. 7 is a graph showing the relationship between the oxygen storage capacity OSC (g) of the catalyst and the lean output time ratio HL. In the graph, the upper points A1, A2, . . . A9 represent data obtained when low sulfur fuel (with a sulfur concentration of 30 ppm) was used, and the lower points B1, B2, . . . B9 represent data obtained when high sulfur fuel (with a sulfur concentration of 300 ppm) was used. A1, A2, . . . A9 changed to B1, B2, . . . B9, respectively, as shown by the arrows in the graph, when there was a change from low sulfur fuel to high sulfur fuel. The value of the oxygen storage capacity OSC is smaller and the degree of catalyst deterioration is greater as the numbers 1, 2, . . . 9 increase, i.e., toward the data on the left.

As shown in the drawing, when focusing on the data group of one of the fuels, a linear or proportional relationship can be seen in the data group, in which the lean output time ratio HL tends to increase as the oxygen storage capacity OSC decreases. Also, when there was a change from low sulfur fuel to high sulfur fuel, the oxygen storage capacity OSC and the lean output time ratio HL decrease simultaneously. The ratio of the lean output time ratio decrease amount with respect to the oxygen storage capacity decrease amount increases as the degree of catalyst deterioration increases, such that the slope of the arrows in the drawing becomes more vertical. The amount of decrease in lean output time ratio when there is a change from low sulfur fuel to high sulfur fuel increases as the degree of catalyst deterioration increases. Incidentally, when there is a change from low sulfur fuel to high sulfur fuel, data in which the value of the oxygen storage capacity has changed from a value larger than the deterioration determining value OSC to a value smaller than the deterioration determining value OSC is data that will erroneously determine that the catalyst is deteriorated.

In this example embodiment, the oxygen storage capacity measured value is corrected using these test results. For example, a map in which the data A1 to A9 and B1 to 9B are grid points is created and stored in advance in the ECU 20. Data $\alpha$ that is actually obtained is applied to the map and corrected so that it becomes equivalent to or comes as close as possible to true data A$\alpha$ corresponding to when low sulfur fuel is used.

Figure 8:
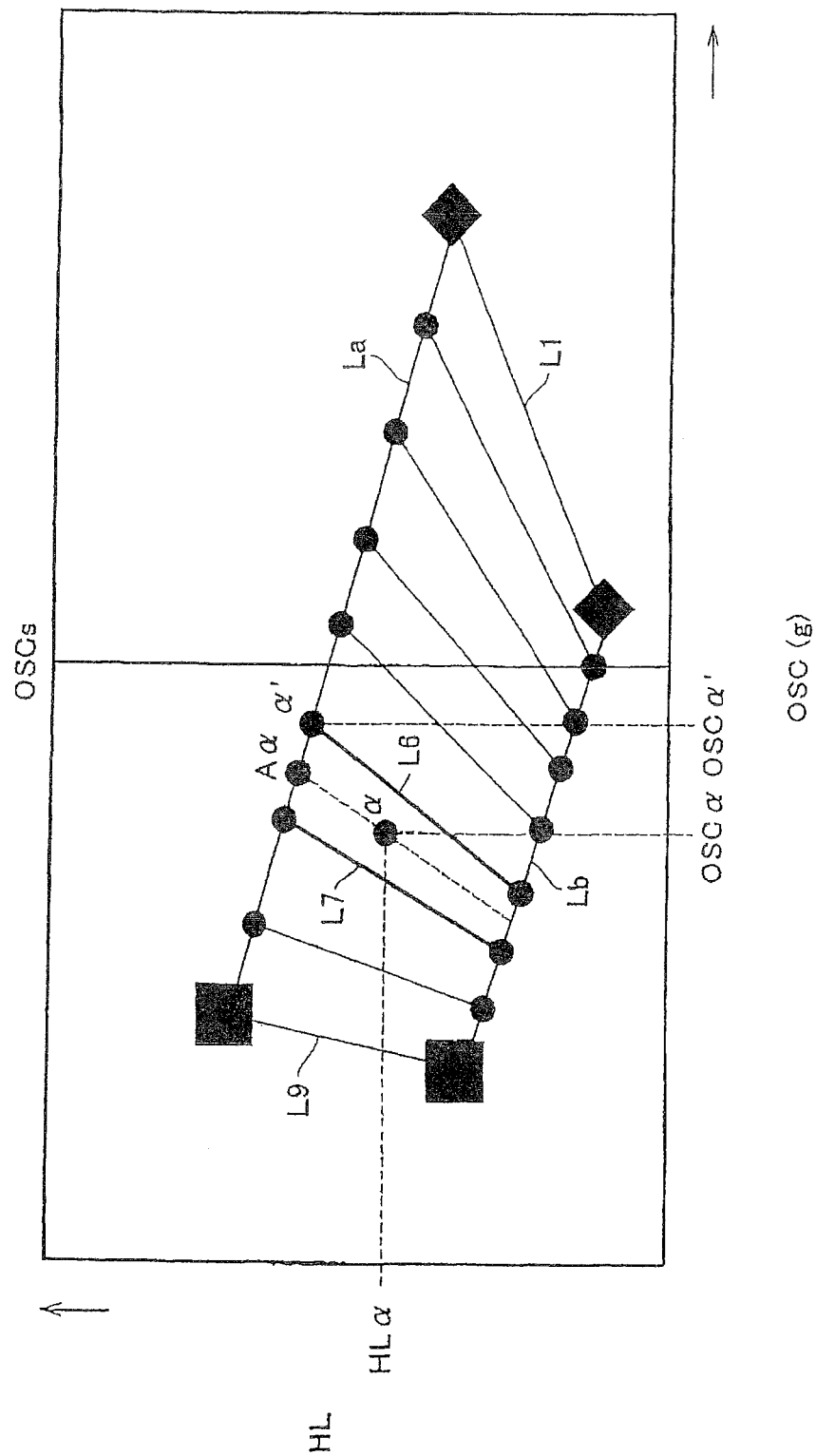
FIG. 8 is a map in which the oxygen storage capacity and the lean output time ratio are used as parameters.

More specifically, the oxygen storage capacity measured value is corrected in the following manner. As shown in FIG. 8, the data A1 to A9 and B0 to B9 are set close to two straight lines La and Lb, respectively, on a map having the oxygen storage capacity OSC and the lean output time ratio HL as parameters, and this is then stored in the ECU 20. Incidentally, for the sake of convenience, x is substituted for OSC and y is substituted for HL. The straight line La when low sulfur fuel is used can be expressed by $y=a_1x+a_2$, and the straight line Lb when high sulfur fuel is used can be expressed by $y=b_1x+b_2$ (where $a_1$ and $b_1$ are slopes and $a_2$ and $b_2$ are segments). Meanwhile, the straight line Ln that connects An and En (n=1, 2, ... 9) is also set as $y=c_1(n)x+c_2(n)$ (where $c_1(n)$ is a slope and $c_2(n)$ is a segment). The value of these slopes $a_1$, $b_1$, $c_1(n)$ and segments $a_2$, $b_2$, $c_2(n)$ are stored in the ECU 20.

For example, when the data α is actually measured, the position of this data α between straight lines Ln is obtained. In the illustrated example, the data α is positioned between the straight line L6 and the straight line L7. Next, the value of x (=OSCα) that is the same as this data α is substituted into the expressions of both straight lines, and the straight line with the smaller y value (i.e., the straight line directly below the data α) is selected. In the illustrated example, the straight line L6 is selected. Then the point of intersection (A6) of this selected straight line and the straight line La:$y=a_1x+a_2$ when low sulfur fuel is used is obtained. This point of intersection is designated as the corrected data α' and the value (=OSCα') of x of the data α' is calculated as and determined to be the value of the corrected oxygen storage capacity.

Incidentally, when the actually measured data α is positioned on the left side of the straight line L9, i.e., when y which is obtained by substituting x that is the same as the data α into the expression of the straight line L9 is smaller than the y of the data α, a correction is not made. This is because even if a correction was made, it would still be determined that the catalyst is deteriorated. Also, when the actually measured data α is positioned on the right side of the straight line L1, i.e., when y which is obtained by substituting x that is the same as the data α into the expression of the straight line L1 is larger than the y of the data α, a correction is not made. This is because even if a correction was made, it would still be determined that the catalyst is normal.

Also, when the actually measured data α is on one of the straight lines Ln, the point of intersection of that straight line Ln and the straight line La, i.e., An itself is designated the corrected data α'.

With this correction method, the value of the corrected oxygen storage capacity tends to be greater than the true value (the x of Aα), so there are cases in which when the number of data points is small, an excessive correction is made such that it is erroneously determined that the catalyst is normal. Naturally, there may be many data points, but due to the limitations of the memory capacity of the ECU and the like, the number of data points may be increased around the deterioration determining value OSCs and in regions where the correction amount is large, and decreased in other regions for example, in order to obtain maximum results from the fewest data points.

Figure 9:
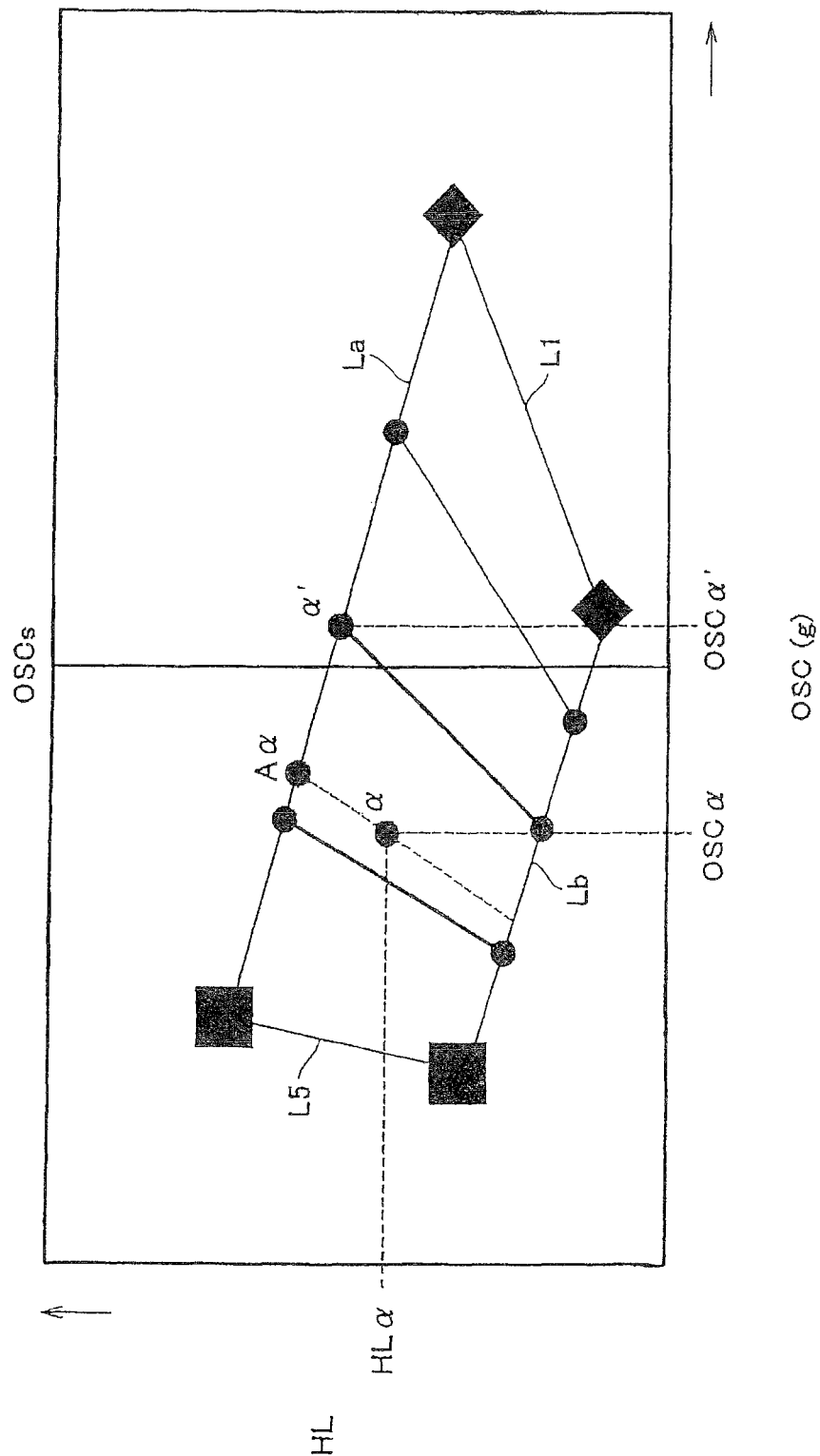
FIG. 9 is another map in which the oxygen storage capacity and the lean output time ratio are used as parameters.

FIG. 9 shows an example in which the number of data points is small and it is erroneously determined that the catalyst is normal. The actually measured data α is corrected to α' so it is determined that the catalyst is normal. However, the true corrected data is Aα so the determination should be that the catalyst is deteriorated. In this case, an overcorrection resulted in an erroneous diagnosis being made.

Figure 10:
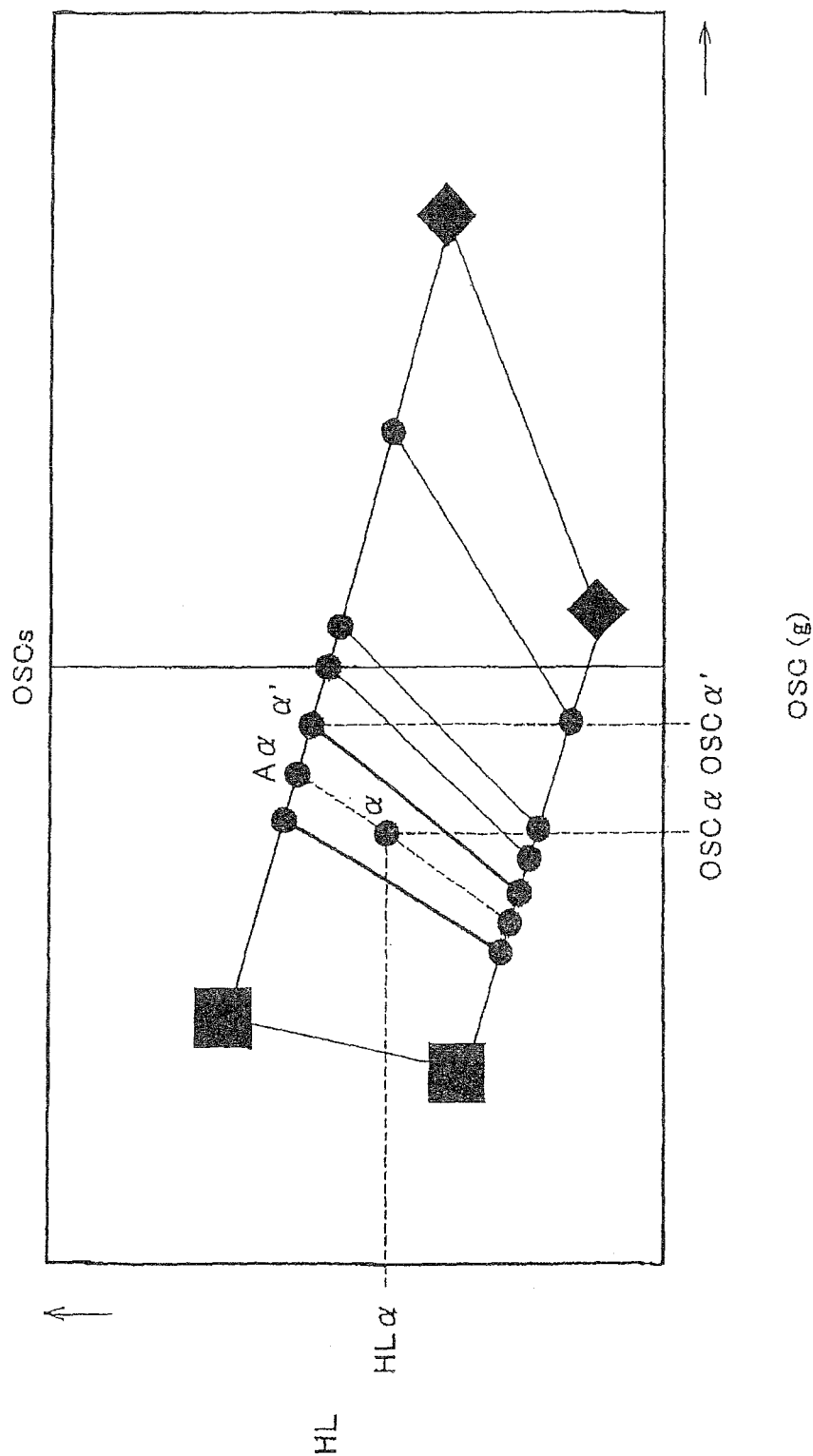
FIG. 10 is yet another map in which the oxygen storage capacity and the lean output time ratio are used as parameters.

In contrast, FIG. 10 shows an example in which the number of data points has been increased around the deterioration determining value OSCs and decreased in other areas. The actually measured data α is corrected to α'. However, the correction amount at this time is small so just as with the true corrected data Aα, the corrected data α' also results in a determination that that the catalyst is deteriorated. As a result, a correct diagnosis is made.

Figure 11:
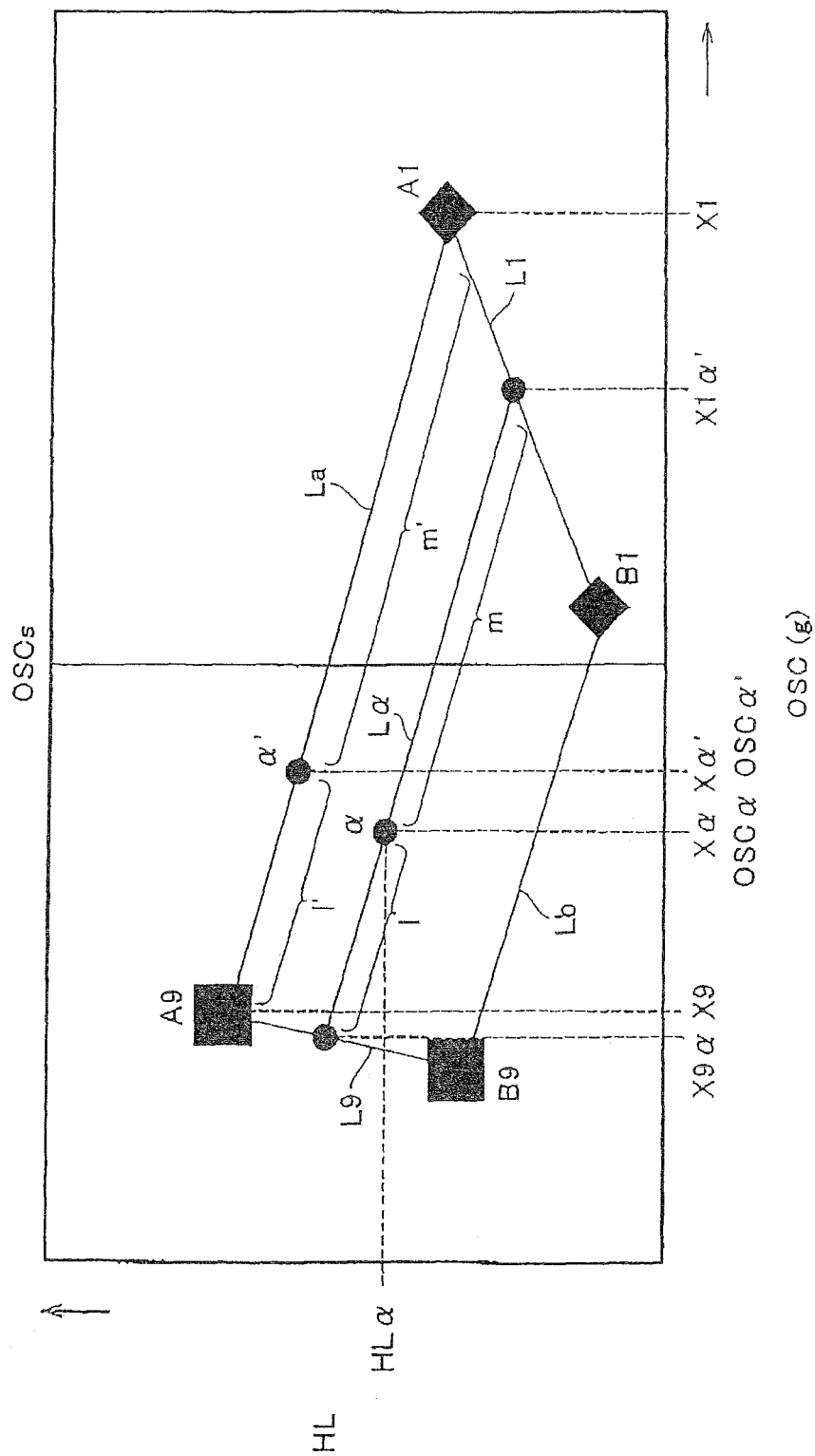
FIG. 11 is still another map in which the oxygen storage capacity and the lean output time ratio are used as parameters.

Here, another correction method will be described with reference to FIG. 11. Two straight lines La and Lb that connect the data on both ends, i.e., A1 and A9 and B1 and B9, from among the data A1 to A9 and B1 to B9, respectively, are set on a map having the oxygen storage capacity OSC and the lean output time ratio HL as parameters, and this is then stored in the ECU 20. The straight line La when low sulfur fuel is used can be expressed by $y=a_1x+a_2$, and the straight line Lb when high sulfur fuel is used can be expressed by $y=b_1x+b_2$. Incidentally, the straight line Lb when high sulfur fuel is used is not used so it may be omitted. Also, two straight lines L1 and L9 that connect A1 with B1 and A9 with B9, respectively, are also set and stored in the ECU 20. The straight line L1 can be expressed by $y=c_1(1)x+c_2(1)$, and the straight line L9 can be expressed by $y=c_1(9)x+c_2(9)$. The value of these slopes $a_1$, $b_1$, $c_1(1)$, and $c_1(9)$ and segments $a_2$, $b_2$, $c_2(1)$, and $c_2(9)$ are stored in the ECU 20.

Here, the two straight lines La and Lb may be regarded as being parallel, and the graphic form enclosed by the four straight lines La, Lb, L1, and L9 may be regarded as trapezoidal. When actually measuring the data α there, the corrected data α' is calculated using the ratio between the straight lines L1 and L9. More specifically, a straight line Lα:$y=a_1x+a_{2\alpha}$ which passes through the data α and is parallel to the straight line La is determined. This determination is made by substituting the coordinates (x,y) of the data α into the expression $y=a_1x+a_{2\alpha}$ and obtaining $a_{2\alpha}$.

Next, the x coordinates x1α and x9α of the points of intersection of this straight line Lα and the straight lines L1 and L9 are obtained.

Finally, a point on the straight line La such that 1:m=1':m' is obtained. This point is designated the corrected data α' and the value (xα'=OSCα') of x of the data α' is calculated and determined to be the value of the corrected oxygen storage capacity. More specifically, xα' is obtained based on Expression (2) below with the x coordinate of A1 as x1, the x coordinate of A9 as x9, and the x coordinate of the data α as xα.

$$(x1\alpha - x\alpha)(x\alpha' - x9) = (x\alpha - x9\alpha)(x1 - x\alpha') \qquad (2)$$

According to the correction described above, the value of the measured oxygen storage capacity is corrected to a value corresponding to when low sulfur fuel is used, regardless of the oxygen storage capacity or the concentration of sulfur in the fuel during that measurement. As a result, the value of the oxygen storage capacity measured when high sulfur fuel is used can be corrected to a true value that corresponding to when low sulfur fuel is used, such that an accurate deterioration diagnosis can be made and an erroneous diagnosis due to the effects from sulfur can be reliably prevented. More specifically, a correction is made also taking into account the degree of catalyst deterioration, regardless of the lean output time ratio HL. For example, a large correction is made in a catalyst in which the degree of deterioration is small, and a small correction is made in a catalyst in which the degree of deterioration is large. This is in response to a large decrease in the oxygen storage capacity in a catalyst in which the degree of deterioration is small, and a small decrease in the oxygen storage capacity in a catalyst in which the degree of deterioration is large (i.e., in response to the difference in the degree of effect from the sulfur depending on the degree of catalyst deterioration), when there is a change from low sulfur fuel to high sulfur fuel. Accordingly, with this example embodiment an extremely accurate correction can be made, which further improves the accuracy of the diagnosis.

When detecting the output behavior of the downstream air-fuel ratio sensor 18 during stoichiometric feedback control, more specifically, when measuring the cumulative lean time ΣtL, the engine may be operated under a high load, as it is when it is accelerating, for example. This is because the fluctuation in the output of the downstream air-fuel ratio sensor 18 is larger when the engine is operating under a high load than it is when the engine is operating under a low load, so the difference between when low sulfur fuel is used and when high sulfur fuel is used is even more evident. For example, the detection and measurements described above are preferably done when the intake air amount Ga detected by the airflow meter 5 is equal to or greater than a predetermined value or when the accelerator operation amount detected by the accelerator operation amount sensor 15 is equal to or greater than a predetermined value. Incidentally, in response to this, it is possible to obtain the value when the engine is operating under a high load also when obtaining the map data An and Bn.

Incidentally, in the correction described above, the oxygen storage capacity measured value is corrected so that it comes as close as possible to the true value. Alternatively, however, the oxygen storage capacity measured value may also be corrected to a direct and true value using normal map interpolation. However, the method described above is advantageous in that it involves a lighter calculation load than the method of correcting the oxygen storage capacity measured value to the true value. Also, with a correction such as that shown in FIG. 8, a corrected value that is slightly larger than the true value is obtained (i.e., the straight line Ln directly below the data α is selected), but conversely, a corrected value that is slightly smaller than the true value may also be obtained (i.e., the straight line Ln directly above the data α may be selected). Of course, the number of data point can be set as appropriate, and a function may also be used instead of the map.

Figure 12:
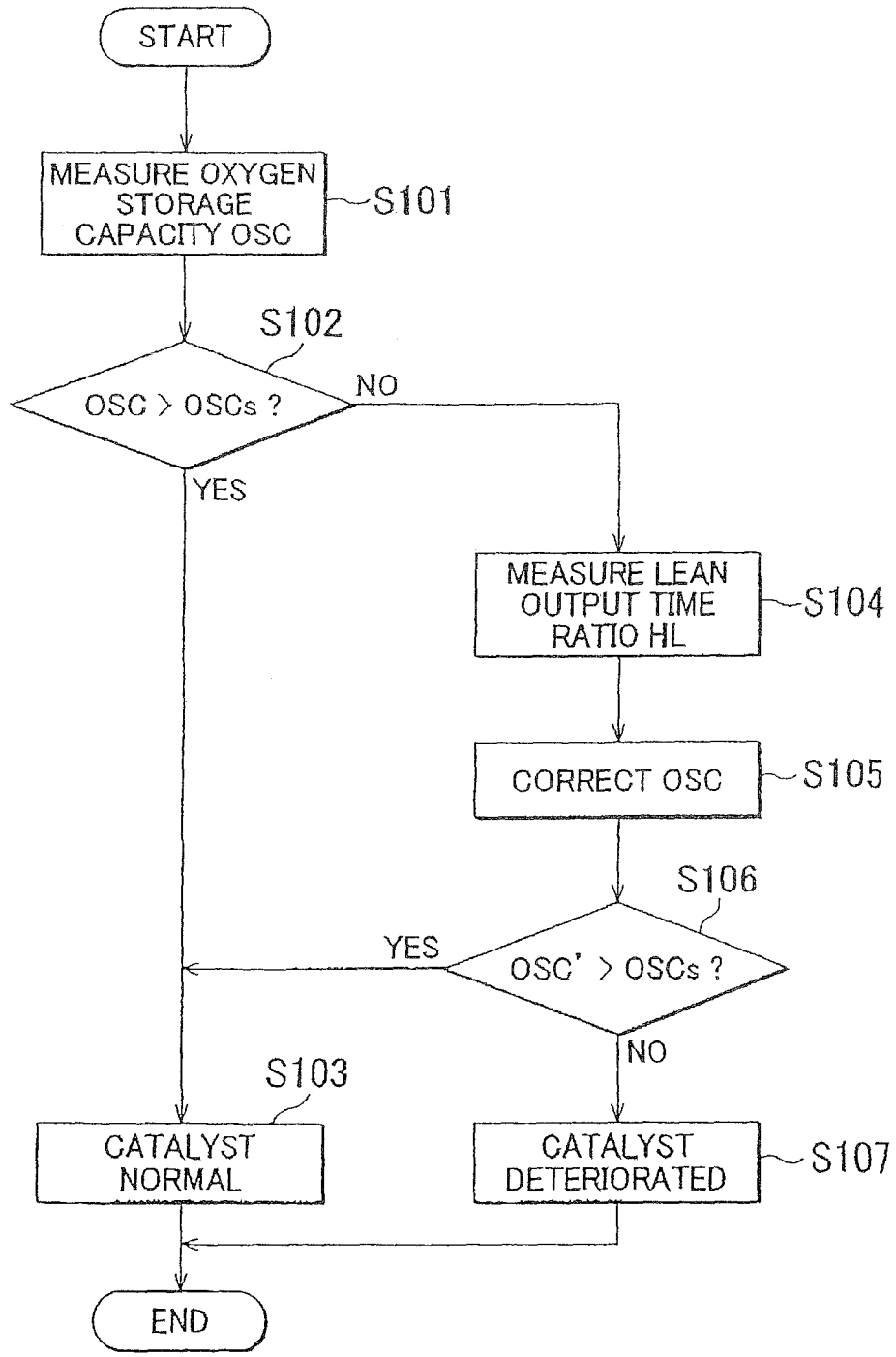
FIG. 12 is a flowchart illustrating a catalyst deterioration diagnostic routine.

Next, the steps in a catalyst, deterioration diagnostic routine according to the example embodiment will be described with reference to FIG. 12. This routine is executed by the ECU 20.

First in step S101, the oxygen storage capacity OSC of the catalyst 11 is measured based on the Cmax method described above. In this step, it is first determined whether a precondition suitable for executing the deterioration diagnostic is satisfied. This precondition is satisfied when, for example, the engine is in a steady operating state such as when the fluctuation width of the intake air amount Ga and the engine speed Ne is within a predetermined range, and the catalyst 11 and the upstream and downstream air-fuel ratio sensors 17 and 18 have reached a predetermined activation temperature. If the precondition is not satisfied, the deterioration diagnostic is not executed. If, on the other hand, the precondition is satisfied, the oxygen storage capacity OSC starts to be measured. That is, as described above, active air-fuel ratio control is started, and the oxygen storage capacity OSC of the catalyst 11 is measured following execution of this active air-fuel ratio control.

In this way, when the oxygen storage capacity OSC has finished being measured, then in step S102, the oxygen storage capacity measured value OSC is compared with a predetermined deterioration determining value OSCs. If the oxygen storage capacity measured value OSC is greater than the deterioration determining value OSCs, the catalyst 11 is determined to be normal in step S103.

If, on the other hand, the oxygen storage capacity measured value OSC is equal to or less than the deterioration determining value OSCs, the process proceeds on to step S104. In step S104, stoichiometric feedback control is executed, during which the lean output time ratio HL is measured. That is, the lean time tL is added up during a predetermined period of time tp while stoichiometric feedback control is being executed, and the lean output time ratio HL is calculated by dividing the cumulative lean time ΣtL by the predetermined period of time tp. Incidentally, as described above, the predetermined period of time tp may also be set when the engine is operating under a high load, and this lean time tL may be added up.

In this way, when the lean output time ratio HL is measured, the oxygen storage capacity measured value OSC may be corrected in step S105. That is, the oxygen storage capacity measured value OSC is corrected to a value OSC' corresponding to when low sulfur fuel is used according to the correction method described above, using a map such as that in FIG. 8 or 11, based on the oxygen storage capacity measured value OSC measured in step S101 and the lean output time ratio HL measured in step S104.

Next, in step S106, the corrected oxygen storage capacity measured value OSC' is compared with the deterioration determining value OSCs. If the corrected oxygen storage capacity measured value OSC' is greater than the deterioration determining value OSCs, it is determined in step S103 that the catalyst 11 is normal. If, on the other hand, the corrected oxygen storage capacity measured value OSC' is equal to or less than the deterioration determining value OSCs, it is determined in step S107 that the catalyst 11 is deteriorated.

As is evident from this description, here the oxygen storage capacity measured value OSC is only corrected when it is equal to or less than the deterioration determining value OSCs. The oxygen storage capacity measured value OSC is not corrected when it is greater than the deterioration determining value OSCs. Even if the oxygen storage capacity measured value falls below the true oxygen storage capacity due to the effect of the sulfur, the true oxygen storage capacity is clearly within the normal range when the oxygen storage capacity measured value exceeds the deterioration determining value, so there is no need to make the correction. Conversely, by correcting the oxygen storage capacity measured value OSC only when it is equal to or less than the deterioration determining value OSCs, the correction is made as infrequently as possible, which simplifies the diagnostic routine.

Next, a second example embodiment of the invention will be described. Much of this second example embodiment is similar to the first example embodiment described above so only the differences will be described.

Figure 13:
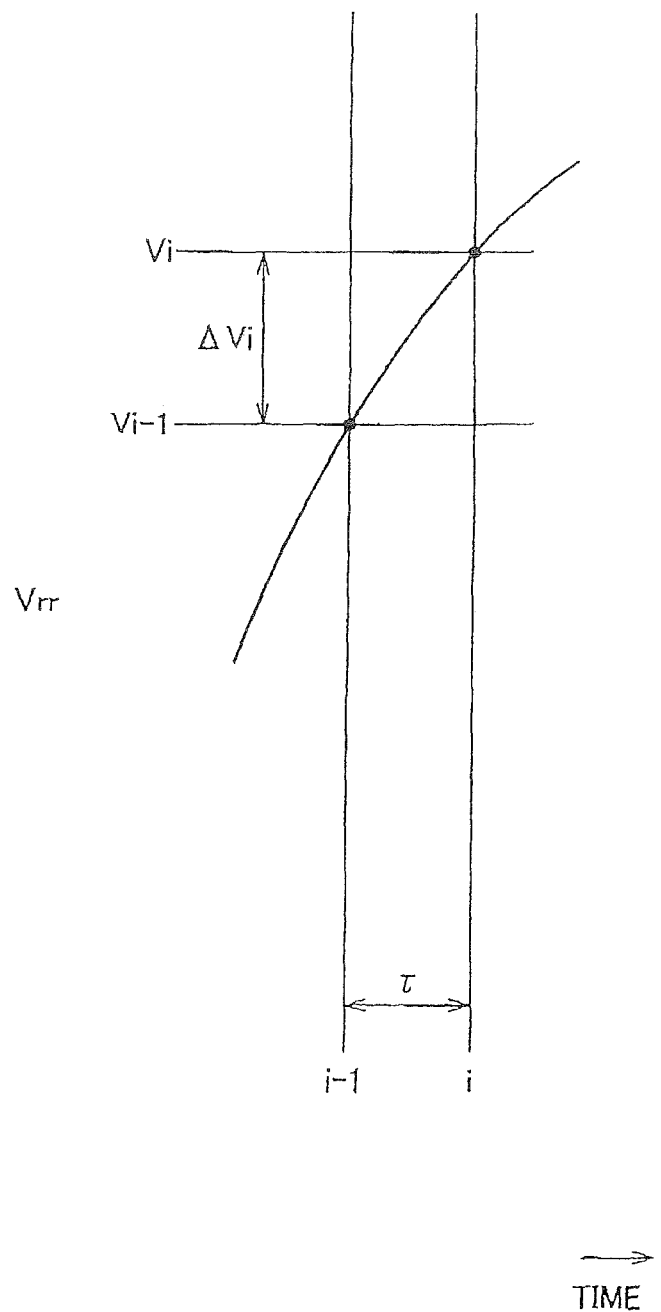
FIG. 13 is a view illustrating a method for calculating the output trajectory length of the downstream air-fuel ratio sensor output.

Here, the trajectory length of the downstream air-fuel ratio sensor output during stoichiometric feedback control (hereinafter referred to as the "downstream sensor trajectory length") is used as a parameter indicative of the output behavior of the downstream air-fuel ratio sensor 18. This downstream sensor trajectory length is a value obtained by adding up the difference between the last output value and the current output value for each predetermined calculation cycle or sampling cycle (such as every 16 milliseconds) τ, as shown in FIG. 13. For example, when the downstream air-fuel ratio sensor output value of the current timing i is designated as $V_i$ and the downstream air-fuel ratio sensor output value of the last timing i-1 is designated as $V_{i-1}$, the output difference $\Delta V_i$ at the current timing i can be expressed as $|V_i - V_{i-1}|$. The downstream sensor trajectory length Trr is then calculated by adding up this output difference $\Delta V_i$ with each cycle.

As shown in FIGS. 6A to 6D, when there is a change from the state in which the catalyst is deteriorated and low sulfur fuel is used, as shown in FIG. 6C, to a state in which the catalyst is deteriorated and high sulfur fuel is used, as shown in FIG. 6D, while stoichiometric feedback control is being executed, the entire output waveform of the downstream air-fuel ratio sensor 18 shifts toward the rich side. As a result, the downstream air-fuel ratio sensor output Vrr has more difficulty oscillating to the lean side such that the downstream sensor trajectory length Trr ultimately tends to decrease. Although not shown, strictly speaking, the opportunity to maintain the downstream air-fuel ratio sensor output Vrr at a rich limit value (such as around 0.9 (V)) increases, and at this time the downstream sensor trajectory length Trr does not increase. This is also a reason for the tendency of the downstream sensor trajectory length Trr to decrease. Accordingly, the downstream sensor trajectory length Trr is a parameter correlating to the concentration of sulfur in the fuel.

Incidentally, it is also evident that while stoichiometric feedback control is being executed, the ratio of the trajectory length of the upstream air-fuel ratio sensor output, i.e., the upstream sensor trajectory length Tfr, to the downstream sensor trajectory length Trr (i.e., HT=Trr/Tfr) also changes according to a change in the concentration of sulfur in the fuel, similar to the downstream sensor trajectory length Trr. Here, the upstream sensor trajectory length Tfr is a value obtained by adding up the difference between the last value and the current value of the value obtained by converting the upstream air-fuel ratio sensor output to the air-fuel ratio A/Ffr, in each sampling cycle τ. For example, when the upstream air-fuel ratio at the current timing i is designated as $A/F_i$, and the upstream air-fuel ratio at the last timing i-1 is designated as $A/F_{i-1}$, the air-fuel ratio difference $\Delta A/F_i$ at the current timing i can be expressed as $|A/F_i - A/F_{i-1}|$. The upstream sensor trajectory length Tfr is then calculated by adding up this air-fuel ratio difference $\Delta A/F_i$ with each cycle. The trajectory length ratio HT also takes into account fluctuation in the upstream air-fuel ratio as well as fluctuation in the downstream air-fuel ratio, so it is more suitable than the downstream sensor trajectory length as a parameter indicative of the output behavior of the downstream air-fuel ratio sensor 18. Therefore, in this example embodiment, the trajectory length ratio HT is used as the parameter.

Figure 14:
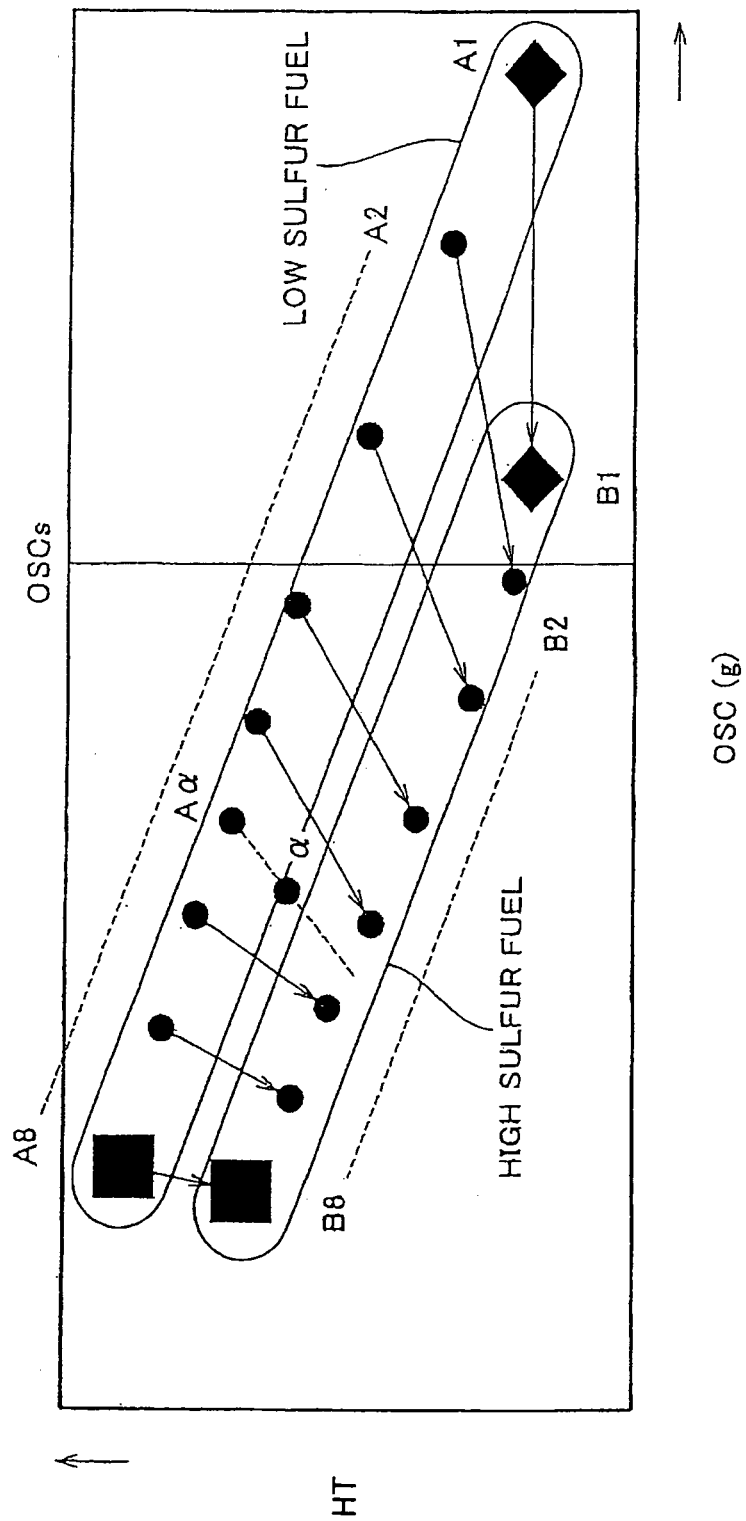
FIG. 14 is a graph showing the relationship between the trajectory length ratio and the oxygen storage capacity of the catalyst according to a second example embodiment of the invention.

Incidentally, the results of tests performed by the inventors confirmed that i) there is a fixed correlation between the trajectory length ratio and the oxygen storage capacity, similar to that between the lean output time ratio and the oxygen storage capacity, and ii) the decrease width of the trajectory length ratio HT changes according to the original degree of catalyst deterioration, when there is a change from low sulfur fuel to high sulfur fuel. FIG. 14 shows this.

FIG. 14 is a graph showing the relationship between the trajectory length ratio HT and the oxygen storage capacity OSC (g) of the catalyst. As is evident from the drawing, this relationship closely resembles the relationship between the lean output time ratio HL and the oxygen storage capacity OSC shown in FIG. 7. Therefore, the above description can be followed by replacing the lean output time ratio HL with the trajectory length ratio HT, and the correction method described above can be used. Accordingly, in this second example embodiment, the oxygen storage capacity measured value is corrected using the same method by replacing the lean output time ratio HL of the first example embodiment with the trajectory length ratio HT. Elements in FIG. 14 that correspond to the same elements in FIG. 7 will be denoted by the same reference characters and detailed descriptions of those elements will be omitted. Incidentally, the upper points A1, A2, . . . A8 represent data obtained when low sulfur fuel (with a sulfur concentration of 30 ppm) was used, and the lower points B1, B2, . . . B8 represent data obtained when high sulfur fuel (with a sulfur concentration of 300 ppm) was used.

Figure 15:
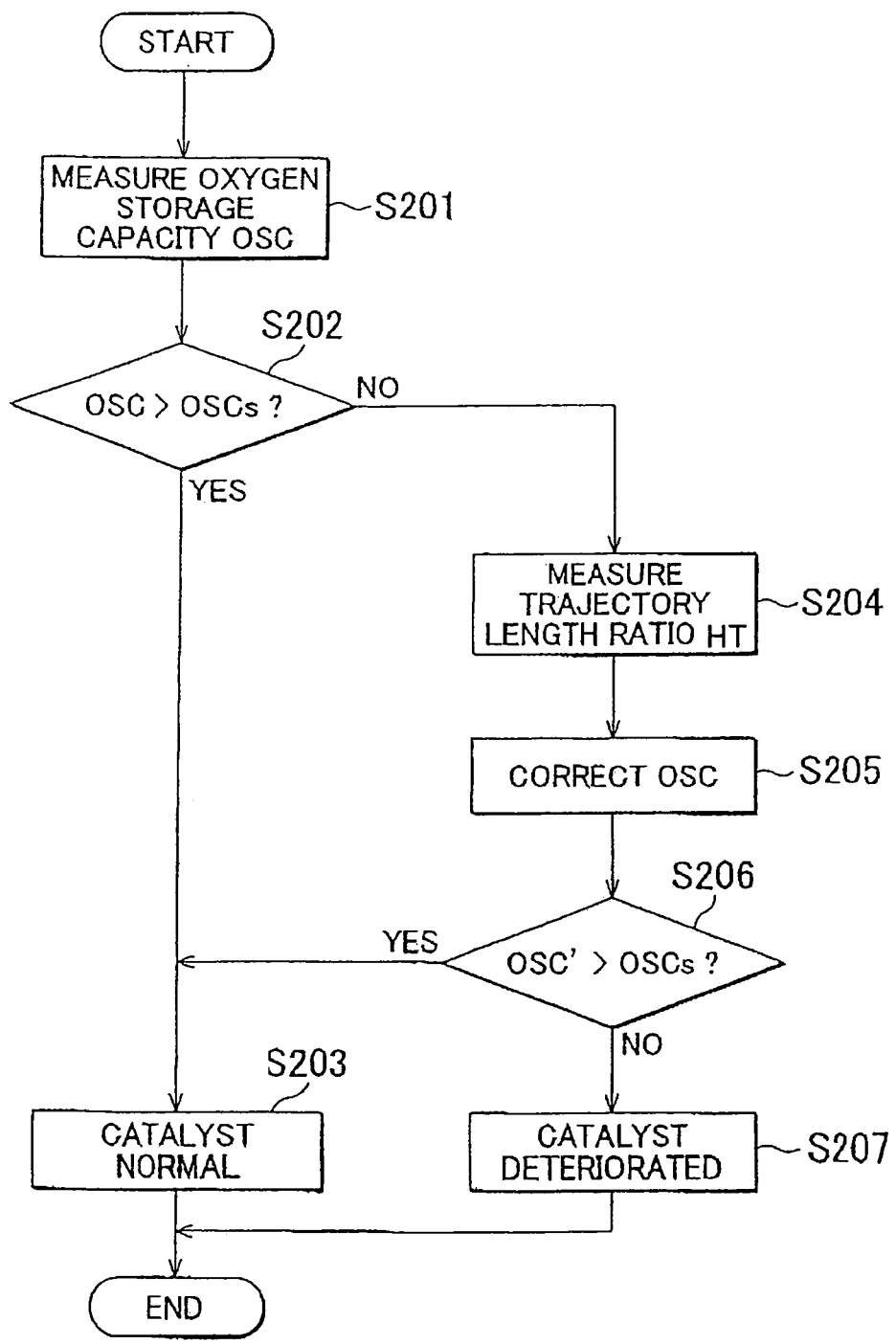
FIG. 15 is a flowchart illustrating a catalyst deterioration diagnostic routine according to the second example embodiment of the invention.

FIG. 15 illustrates the steps of a catalyst deterioration diagnostic routine according to this example embodiment. These steps are substantially the same as the steps shown in FIG. 12, except for that i) the trajectory length ratio HT is measured in step S204 instead of the lean output time ratio HL being measured in step S104, and ii) the correction is made using the trajectory length ratio HT in step S205 instead of being made using the lean output time ratio HL in step S105. Accordingly, corresponding steps in this example embodiment are denoted by the same step number except that they start with a 2 instead of a 1, and detailed descriptions will be omitted.

While example embodiments have been described in detail, various other example embodiments are also possible. For example, the use and type of the internal combustion engine are arbitrary, e.g., it may be used in something other than a vehicle, and it may be a direct injection type internal combustion engine. A wide-range air-fuel ratio sensor similar to the upstream air-fuel ratio sensor may be used for the downstream air-fuel ratio sensor, and an $O_2$ sensor similar to the downstream air-fuel ratio sensor may be used for the upstream air-fuel ratio sensor. An air-fuel ratio sensor is broadly considered to be any sensor that detects the air-fuel ratio of exhaust gas, including such wide-range air-fuel ratio sensors and $O_2$ sensors.

While the invention has been described with reference to example embodiments thereof, it is to be understood that the invention is not limited to the described embodiments or constructions. To the contrary, the invention is intended to cover various modifications and equivalent arrangements. In addition, while the various elements of the disclosed invention are shown in various example combinations, and configurations, other combinations and configurations, including more, less or only a single element, are also within the scope of the appended claims.

The invention claimed is:

1. An apparatus for diagnosing deterioration of a catalyst provided in an exhaust passage of an internal combustion engine, the apparatus comprising:
   an upstream air-fuel ratio sensor provided upstream of the catalyst;
   a downstream air-fuel ratio sensor provided downstream of the catalyst; and
   an electronic control unit that includes program logic that:
   performs stoichiometric feedback control on an air-fuel ratio of exhaust gas that flows into the catalyst by controlling a fuel injector, based on at least an output from the upstream air-fuel ratio sensor;
   measures an oxygen storage capacity of the catalyst; and
   in case a measured value of the oxygen storage capacity of the catalyst is equal to or less than a predetermined deterioration determination value;
      calculates a ratio of a time period of lean output of the downstream air-fuel ratio sensor, which is leaner than a predetermined value, to a predetermined time period;
      corrects the measured value of the oxygen storage capacity of the catalyst, based on the ratio; and
      determines whether the catalyst is deteriorated by comparing the corrected measured value of the oxygen storage capacity with the predetermined deterioration determination value.

2. The apparatus according to claim 1, wherein the predetermined value is set to a value corresponding to an air-fuel ratio that is leaner than a stoichiometric air-fuel ratio.

3. The apparatus according to claim 1, wherein the electronic control unit corrects the measured value of the oxygen storage capacity using a preset relationship between the ratio and the oxygen storage capacity.

4. The apparatus according to claim 1, wherein electronic control unit corrects the measured value of the oxygen storage capacity when the internal combustion engine is operating under a high load.

5. A method for diagnosing deterioration of a catalyst provided in an exhaust passage of an internal combustion engine, the method comprising:
performing stoichiometric feedback control on an air-fuel ratio of exhaust gas that flows into the catalyst, based on at least an output from an upstream air-fuel ratio sensor provided upstream of the catalyst;
measuring an oxygen storage capacity of the catalyst; and
in case a measured value of the oxygen storage capacity of the catalyst is equal to or less than a predetermined deterioration determination value;
calculating a ratio of a time period of lean output of a downstream air-fuel ratio sensor provided downstream of the catalyst, which is leaner than a predetermined value, to a predetermined time period;
correcting the measured value of the oxygen storage capacity of the catalyst based on the ratio; and
determining whether the catalyst is deteriorated by comparing the corrected measured value of the oxygen storage capacity with the predetermined deterioration determination value.

6. The method according to claim 5, wherein the predetermined value is set to a value corresponding to an air-fuel ratio that is leaner than a stoichiometric air-fuel ratio.

7. The method according to claim 5, wherein the correcting of the measured value of the oxygen storage capacity is performed using a preset relationship between the ratio and the oxygen storage capacity.

8. The method according to claim 5, wherein the correcting of the measured value of the oxygen storage capacity is performed when the internal combustion engine is operating under a high load.

* * * * *